(12) United States Patent
Bauer et al.

(10) Patent No.: US 12,204,987 B2
(45) Date of Patent: Jan. 21, 2025

(54) QUANTUM DEVICE SIMULATION USING NATURAL-ORBITAL BASIS

(71) Applicant: Microsoft Technology Licensing, LLC, Redmond, WA (US)

(72) Inventors: Roman Bela Bauer, Santa Barbara, CA (US); Samuel Boutin, Goleta, CA (US); William Scott Cole, Jr., Goleta, CA (US); Andrey Antipov, Moscow (RU)

(73) Assignee: Microsoft Technology Licensing, LLC, Redmond, WA (US)

( * ) Notice: Subject to any disclaimer, the term of this patent is extended or adjusted under 35 U.S.C. 154(b) by 504 days.

(21) Appl. No.: 17/454,008

(22) Filed: Nov. 8, 2021

(65) Prior Publication Data
US 2023/0142209 A1 May 11, 2023

(51) Int. Cl.
*G06N 10/00* (2022.01)

(52) U.S. Cl.
CPC .................... *G06N 10/00* (2019.01)

(58) Field of Classification Search
CPC ......... G06N 10/00; G06N 10/60; G06N 10/80
See application file for complete search history.

(56) References Cited

U.S. PATENT DOCUMENTS

| | | | | |
|---|---|---|---|---|
| 11,676,057 | B2 * | 6/2023 | Hastings | G06N 10/00 706/62 |
| 2021/0035002 | A1 * | 2/2021 | Hastings | G06F 15/16 |
| 2021/0117512 | A1 * | 4/2021 | Gukelberger | G06F 9/541 |

(Continued)

FOREIGN PATENT DOCUMENTS

| | | | | |
|---|---|---|---|---|
| CN | 114175064 A | * | 3/2022 | ............. G06F 15/16 |
| WO | WO-2020168257 A1 | * | 8/2020 | ............. G06F 17/16 |
| WO | WO-2021021347 A1 | * | 2/2021 | ............. G06F 15/16 |

OTHER PUBLICATIONS

China document (Year: 2022).*

(Continued)

*Primary Examiner* — Stacy Whitmore
(74) *Attorney, Agent, or Firm* — Alleman Hall & Tuttle LLP

(57) ABSTRACT

A computing device including a processor configured to simulate a quantum device at least in part by receiving a single-particle Hamiltonian matrix that describes an initial Hamiltonian operator. The initial Hamiltonian operator may model a plurality of parts of a quantum device. Simulating the quantum device may further include estimating a reduced density matrix associated with a first part, estimating a plurality of eigenvectors and eigenvalues of the reduced density matrix, and generating a transformed Hamiltonian matrix. Generating the transformed Hamiltonian matrix may include transforming the single-particle Hamiltonian matrix into a natural-orbital basis of the first part such that the transformed Hamiltonian matrix has a reduced dimensionality. The natural-orbital basis may be spanned by a subset of the eigenvectors of the reduced density matrix. Simulating the quantum device may further include generating and outputting an estimated solution to a Schrödinger equation that includes the transformed Hamiltonian matrix.

20 Claims, 12 Drawing Sheets

(56) References Cited

U.S. PATENT DOCUMENTS

| | | | |
|---|---|---|---|
| 2022/0019931 A1* | 1/2022 | Jiang | G06N 10/20 |
| 2022/0399083 A1* | 12/2022 | Ayral | G16C 10/00 |
| 2024/0037434 A1 | 2/2024 | Boutin et al. | |
| 2024/0046137 A1* | 2/2024 | Low | G06N 10/60 |

OTHER PUBLICATIONS

Boutin, et al., "Quantum Impurity Models using Superpositions of Fermionic Gaussian States: Practical Methods and Applications", In Journal of Physical Review Research, vol. 3, Issue 3, Aug. 24, 2021, 15 Pages.

Karzig, et al., "Scalable Designs for Quasiparticle-Poisoning-Protected Topological Quantum Computation with Majorana Zero Modes", In Journal of Physical Review B, vol. 95, Issue 23, Jun. 21, 2017, 32 Pages.

Souto, et al., "Transient Dynamics of a Magnetic Impurity Coupled to Superconducting Electrodes: Exact Numerics Versus Perturbation Theory", In Repository of arXiv:2108.05959v1, Aug. 12, 2021, 12 Pages.

White, Steven R., "Density Matrix Formulation for Quantum Renormalization Groups", In Journal of Physical Review Letters, vol. 69, Issue 19, Nov. 9, 1992, pp. 2863-2866.

Woods, et al., "Effective Theory Approach to the Schrodinger-Poisson Problem in Semiconductor Majorana Devices", In Journal of Physical Review B, vol. 98, Issue 3, Jul. 24, 2018, 28 Pages.

"International Search Report and Written Opinion Issued in PCT Application No. PCT/US22/035203", Mailed Date: Oct. 23, 2023, 12 Pages.

Schollwoeck, Ulrich, "The Density-Matrix Renormalization Group", In Repository of arXiv:cond-mat/0409292v1, Sep. 11, 2004, 57 Pages.

Zheng, et al., "From Real Materials to Model Hamiltonians With Density Matrix Downfolding", In Repository of arXiv:1712.00477v1, Dec. 1, 2017, 24 Pages.

* cited by examiner

QUANTUM DEVICE SIMULATION USING NATURAL-ORBITAL BASIS

BACKGROUND

Developing a quantum device, such as a quantum computing device, typically includes testing the properties of a variety of different device configurations. Performing computer simulation of the quantum device during development allows some properties of the device to be estimated without having to physically construct and perform measurements at the device, thereby allowing the developers to iterate on device configurations more quickly and inexpensively. In addition, computer simulations of quantum devices may be used when interpreting experimental data collected at the quantum devices.

SUMMARY

According to one aspect of the present disclosure, a computing device is provided, including a processor configured to simulate a quantum device at least in part by receiving a single-particle Hamiltonian matrix that describes an initial Hamiltonian operator. The initial Hamiltonian operator may model a plurality of parts of a quantum device. Based at least in part on the single-particle Hamiltonian matrix, simulating the quantum device may further include estimating a reduced density matrix associated with a first part of the plurality of parts. Simulating the quantum device may further include estimating a plurality of eigenvectors and a corresponding plurality of eigenvalues of the reduced density matrix. Simulating the quantum device may further include generating a transformed Hamiltonian matrix associated with the first part. Generating the transformed Hamiltonian matrix may include transforming the single-particle Hamiltonian matrix into a natural-orbital basis of the first part such that the transformed Hamiltonian matrix has a reduced dimensionality relative to the single-particle Hamiltonian matrix. The natural-orbital basis may be spanned by a subset of the plurality of eigenvectors of the reduced density matrix. The eigenvectors included in the subset may respectively have a predetermined number of largest eigenvalues among the corresponding plurality of eigenvalues of the reduced density matrix or may have respective eigenvalues with magnitudes above an eigenvalue magnitude threshold. Simulating the quantum device may further include generating an estimated solution to a Schrödinger equation that includes the transformed Hamiltonian matrix. Simulating the quantum device may further include outputting the estimated solution to one or more additional computing processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, developers of quantum devices frequently perform computer simulations to estimate the behavior of the quantum devices. An exact simulation of a quantum device would itself have to be performed at a quantum computing device. Thus, such computer simulations are performed at least in part at classical computing devices. When quantum device properties are simulated at a classical computing device, some approximations are made in order to allow for simulation of the quantum device via classical computing.

Previous methods of approximation used when simulating quantum devices have low efficiency in terms of memory utilization and computing time when some types of device configuration are simulated. In particular, interactions between electrons in quantum devices that are in the Coulomb-blockade regime have been difficult to simulate efficiently using existing approximation methods. Such interactions frequently play an important role in mesoscopic quantum devices such as quantum computing devices that utilize topological or semiconductor qubits. Thus, the behavior of such devices may be difficult to simulate using existing techniques, thereby hindering the process of quantum device development.

Figure 1:
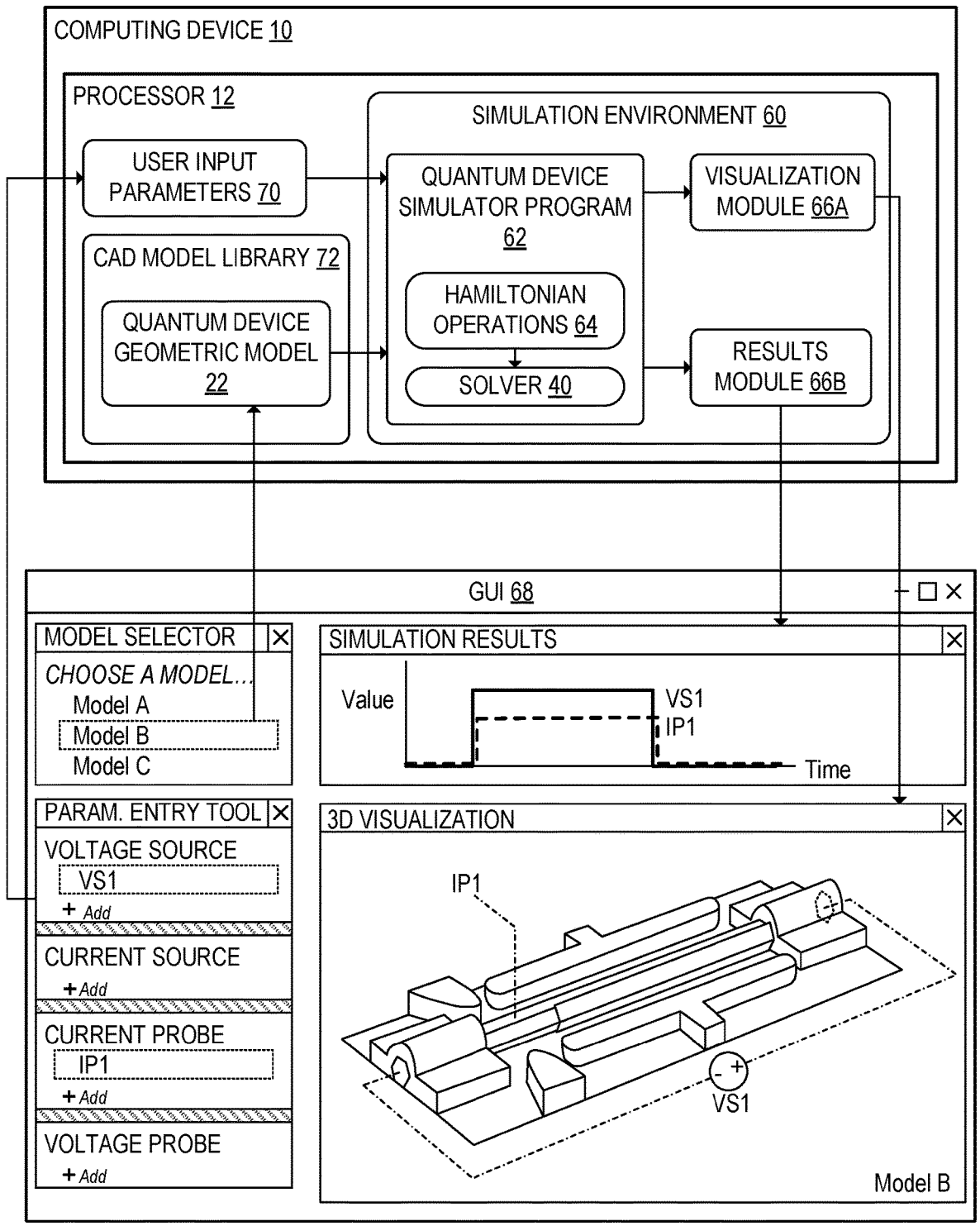
FIG. 1 schematically depicts a computing device including a processor configured to execute a simulation environment including a quantum device simulator program and to generate one or more interface elements for inclusion in a graphical user interface (GUI), according to one example embodiment.

In order to address the above challenges, a computing device 10 is provided, as depicted in FIG. 1 according to one example embodiment. As shown in FIG. 1, the computing device 10 may include a processor 12 configured to simulate a quantum device within a simulation environment 60. In the simulation environment, the processor 12 may be configured to execute a quantum device simulator program 62. When the quantum device simulator program 62 is executed, the processor 12 may be configured to perform one or more Hamiltonian operations 64 to generate estimated Hamiltonian matrices and perform transformations on those estimated Hamiltonian matrices, as discussed in further detail below. In addition, when executing the quantum device simulator program 62, the processor 12 may be further configured to execute a solver 40 that receives results computed during the one or more Hamiltonian operations 64.

The simulation environment 60 may further include one or more modules configured to receive results computed at the quantum device simulator program 62 and process those results for output to a user. For example, the processor 12 may be configured to execute a visualization module 66A and/or a results module 66B. At the visualization module 66A and the results module 66B, the processor 12 may be configured to generate one or more interface elements for inclusion in a graphical user interface (GUI) 68. When the processor 12 executes the visualization module 66A, the processor 12 may be configured to generate a visual representation of the quantum computing device for output at the GUI 68. In the example of FIG. 1, the visual representation of the quantum computing device is a three-dimensional (3D) visualization of a quantum device geometric model 22 of the quantum computing device. The 3D visualization further includes indications of a voltage source VS1 and a current probe IP1 included in the quantum device geometric model 22. The geometric model may also include material properties that have been assigned to each part of the model. The quantum device simulator program 62, for example, may be configured to perform computational finite element analysis on the geometric model to compute an estimate of how electrical parameters change at different locations within the quantum device geometric model 22 based upon the user inputted electrical parameters, the geometry of the model and the material properties of the parts of the model. The results output by the quantum device simulator program 62 may also represented in the 3D visualization, e.g., by using color or other visually distinguishing means, to represent a quantum-mechanical observable that is estimated at the quantum device simulator program 62 for one or more components of the quantum device.

When the processor 12 executes the results module 66B, the processor 12 may be configured to generate a visual representation (e.g. a plot or a table) of one or more quantities computed at the quantum device simulator program. In the example of FIG. 1, the simulation results include estimated values of a voltage output by the voltage source VS1 and a current measured by the current probe IP1 as a function of time.

The GUI 68 may be further configured to receive user input, via one or more interactable elements, that specifies inputs to the quantum device simulator program 62. By interacting with the GUI 68, the user may select one or more user input parameters 70 of the quantum device simulator program 62 with which the processor 12 may be configured to simulate the quantum device. In the example of FIG. 1, the processor 12 may be configured to receive locations and device properties of one or more voltage sources, one or more current sources, one or more current probes, and/or one or more voltage probes at a parameter entry tool included in the GUI 68. For example, the one or more user input parameters 70 may specify an amount of voltage input via each of the one or more voltage sources, an amount of current input via each of the one or more current sources, and/or a respective impedance of each voltage probe and each current probe.

At a model selector interface element included in the GUI 68, the user may further select the quantum device geometric model 22 from among a plurality of quantum device geometric models 22. The processor 12 may be configured to load the selected quantum device geometric model 22 from a computer-aided design (CAD) model library 72 in response to receiving the selection of the selection of the quantum device geometric model 22 at the model selector interface element.

Figure 2:
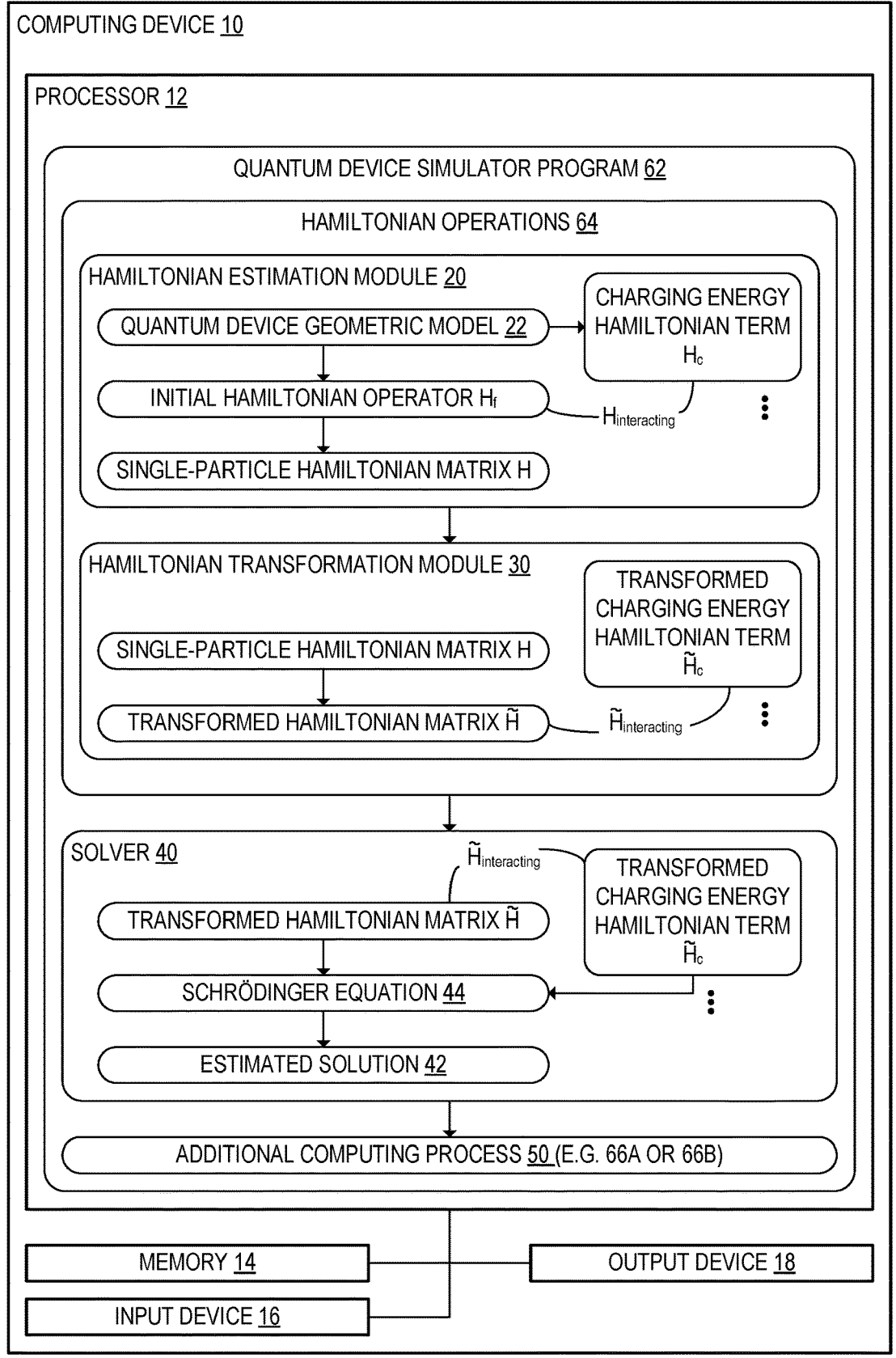
FIG. 2 schematically depicts the computing device of FIG. 1 when the processor is configured to execute a Hamiltonian estimation module, a Hamiltonian transformation module, a solver, and one or more additional computing processes.

Components of the computing device 10 and the quantum device simulator program 62 are schematically shown in additional detail in the example of FIG. 2. As depicted in the example of FIG. 2, the computing device 10 may include a processor 12, memory 14, one or more input devices 16, and one or more output devices 18. The processor 12 may include one or more physical processing devices, such as one or more central processing unit (CPU) cores, one or more graphical processing units (GPUs), one or more hardware accelerators specialized for particular computational tasks, and/or one or more other types of processing devices.

The processor 12 may be operatively coupled to the memory 14 over a data bus. The memory 14 may, for example, include volatile memory and/or non-volatile storage. In addition, the processor 12 may be coupled over the data bus to the one or more input devices 16 and/or the one or more output devices 18. Via the one or more input devices 16, the processor 12 may be configured to receive inputs from a user and/or from one or more other computing devices. Via the one or more output devices 18, the processor 12 may be configured to transmit outputs to the user and/or to the one or more other computing devices 10.

In some examples, components (e.g. the processor 12 or the memory 14) of the computing device 10 may be distributed between a plurality of physical computing devices. For example, the plurality of physical computing devices may be a plurality of server computing devices located in a data center and communicatively coupled over a network. In such examples, one or more components of the computing device 10 may be virtualized such that respective physical components of the plurality of physical computing devices are treated as a single physical component when performing one or more computing processes at those physical components.

The processor 12 may be configured to perform Hamiltonian operations 64 to generate and transform terms of a Hamiltonian operator when executing the quantum device simulation program 62. As shown in the example of FIG. 2, the processor 12 may be configured to execute a toolchain including a Hamiltonian estimation module 20, a Hamiltonian transformation module 30, a solver 40, and one or more additional computing processes 50. As an input to the toolchain, the processor 12 may be configured to receive a quantum device geometric model 22 at the Hamiltonian estimation module 20. The Hamiltonian estimation module 20 may be configured to output a single-particle Hamiltonian matrix H that describes an initial Hamiltonian operator $H_f$ to the Hamiltonian transformation module 30. In addition, in some examples, a plurality of charging energy terms $H_c$ indicated by the quantum device geometric model 22 may be transmitted to the Hamiltonian transformation module 30. The initial Hamiltonian operator $H_f$ may model a plurality of parts of the quantum device, as discussed in further detail below.

The Hamiltonian transformation module 30 may be configured to receive the single-particle Hamiltonian matrix H and output a transformed Hamiltonian matrix $\tilde{H}$. The transformed Hamiltonian matrix $\tilde{H}$ may have a set of fermionic modes with reduced dimensionality compared to the set of fermionic modes of the single-particle Hamiltonian matrix H. At the Hamiltonian transformation module, the processor 12 may be further configured to receive the plurality of charging energy Hamiltonian terms $H_c$ and generate a respective plurality of transformed charging energy Hamiltonian terms $\tilde{H}_c$ based at least in part on the charging energy Hamiltonian terms $H_c$, as discussed in further detail below. The sum of the single-particle Hamiltonian matrix H and the plurality of charging energy Hamiltonian terms $H_c$ may form an interacting Hamiltonian operator $H_{interacting}$.

The solver 40 may be configured to receive the transformed Hamiltonian matrix $\tilde{H}$ and generate an estimated solution 42 to a Schrödinger equation 44 that includes the transformed Hamiltonian matrix $\tilde{H}$. In examples in which the Hamiltonian transformation module 30 is further configured to output a plurality of transformed charging energy Hamiltonian terms $\tilde{H}c$, the solver may be further configured to receive the transformed charging energy Hamiltonian terms $\tilde{H}_c$ and include the transformed charging energy Hamiltonian terms $\tilde{H}_c$ in the Schrödinger equation 44. Thus, in such examples, $\tilde{H}+\tilde{H}_c$ may form a transformed interacting Hamiltonian operator $\tilde{H}_{interacting}$ that is included in the Schrödinger equation 44.

The solver 40 may be further configured to output the estimated solution 42 to the one or more additional computing processes 50. At the one or more additional computing processes 50, the processor 12 may be further configured to perform additional processing on the estimated solution 42. For example, the one or more additional computing processes 50 may include the visualization module 66A and/or the results module 66B. In some examples, the processor 12 may be further configured to output the estimated solution 42 to the user or to one or more other computing devices via the one or more output devices 18.

Figure 3:
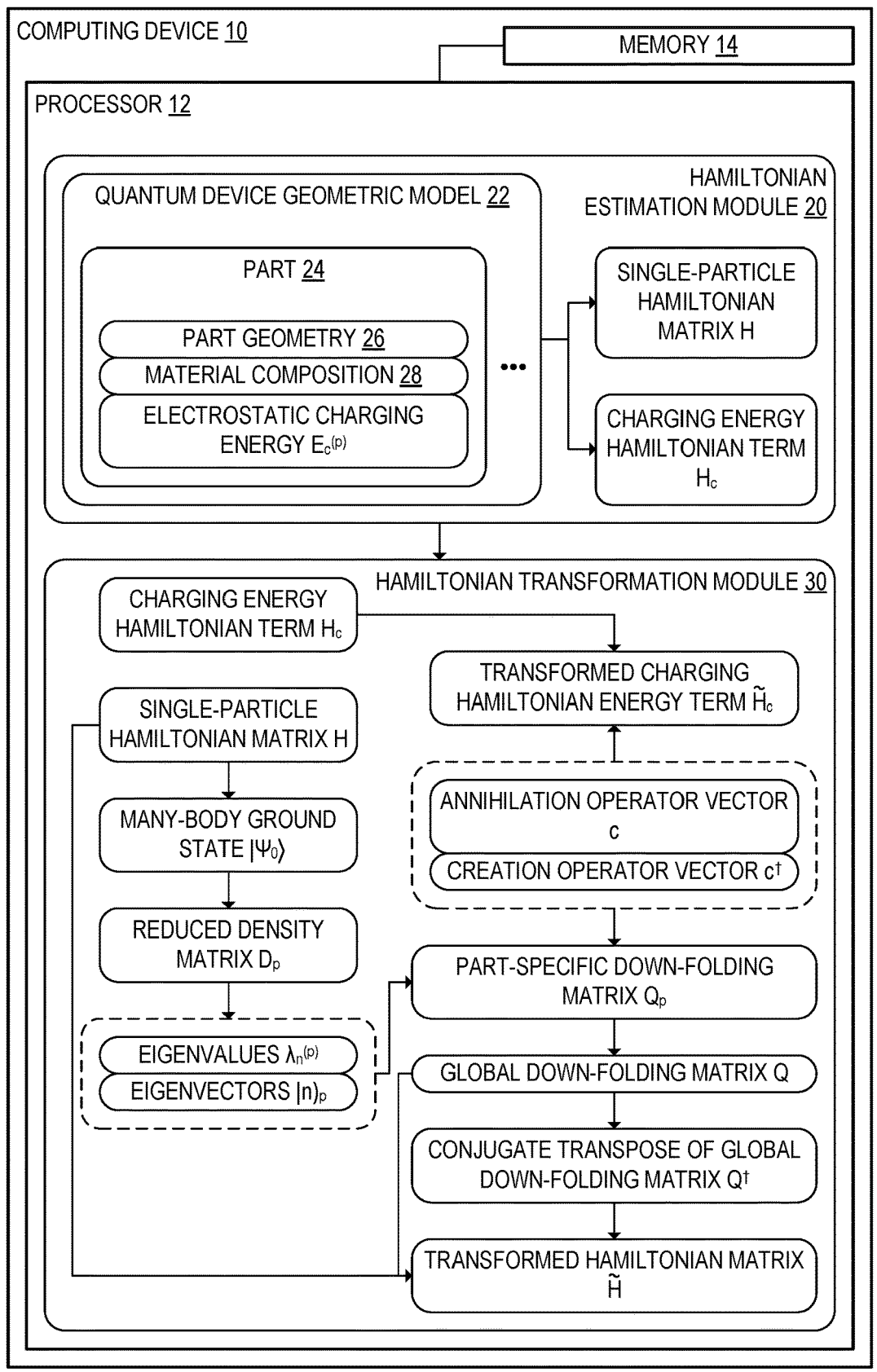
FIG. 3 schematically depicts the Hamiltonian estimation module and the Hamiltonian transformation module in additional detail when the processor computes a transformed Hamiltonian matrix, according to the example of FIG. 1.

FIG. 3 shows the Hamiltonian estimation module 20 and the Hamiltonian transformation module 30 in additional detail. As discussed above, the processor 12 may be configured to receive a quantum device geometric model 22 at the Hamiltonian estimation module 20. For example, the quantum device geometric model 22 may be generated at least in part via user input at a CAD program executed at the processor 12. The quantum device geometric model 22 may be a model of a plurality of parts 24 of the quantum device. The parts 24 of the quantum device may have respective indices p=1, ..., P. In some examples, the quantum device geometric model 22 may indicate a respective plurality of part geometries 26 and material compositions 28 for the plurality of parts 24 of the quantum device. The parts 24 of the quantum device may, for example, be semiconducting, superconducting, metallic, or insulating parts. In some examples, the quantum device geometric model 22 may further indicate respective electrostatic charging energies $E_c^{(p)}$ applied to the plurality of parts 24.

Figure 4:
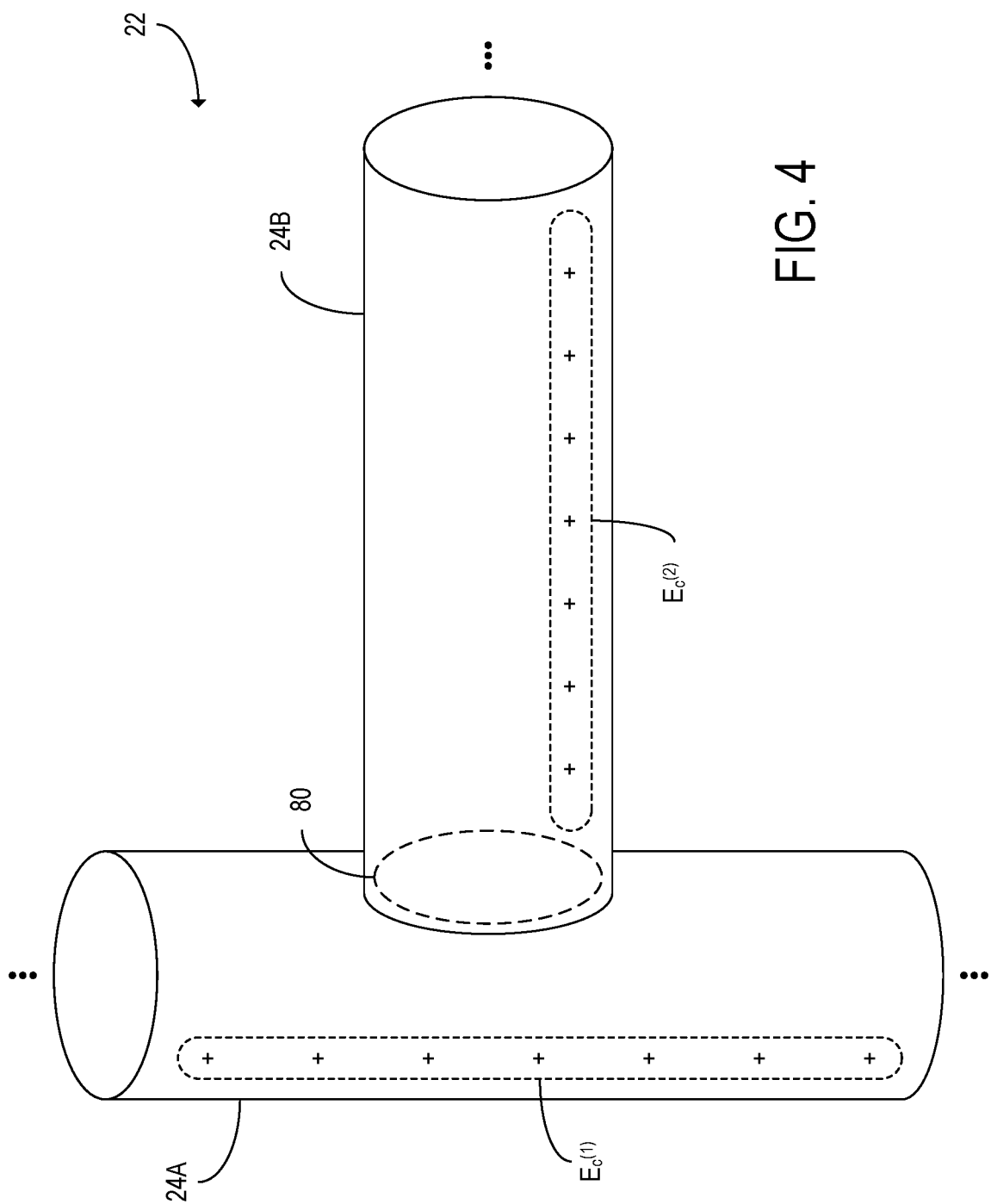
FIG. 4 shows an example first part of a quantum device that interfaces with a second part of the quantum device, according to the example of FIG. 1.

FIG. 4 shows an example portion of a quantum device geometric model 22 including a first part 24A and a second part 24B. The quantum device geometric model 22 shown in the example of FIG. 4 is a three-dimensional model of at least the first part 24A and the second part 24B. The first part 24A and the second part 24B meet at an interface 80. In addition, the first part 24A has a first electrostatic charging energy $E_c^{(1)}$ and the second part has a second electrostatic charging energy $E_c^{(2)}$.

Returning to FIG. 3, at the Hamiltonian estimation module 20, the processor 12 may be further configured to construct the single-particle Hamiltonian matrix H based at least in part on the quantum device geometric model 22 such that the single-particle Hamiltonian matrix H represents the initial Hamiltonian operator $H_f$ that models the plurality of parts 24. The processor 12 may be configured to construct the single-particle Hamiltonian matrix H for a system of fermions within the quantum device that have respective creation operators indicated by $c_i^\dagger$ and respective annihilation operators indicated by $c_i$. A vector of the creation operators for the fermions within a specific part p is denoted by $c_p^\dagger$, and a vector of the annihilation operators for the fermions within that part p is denoted by $c_p$. A vector of all the creation operators of the simulated fermions is denoted by $c^\dagger$, and a vector of all the annihilation operators of the simulated fermions is denoted by c.

The initial Hamiltonian operator $H_f$ may be expressed as follows:

$$H_f = c^\dagger H c = \sum_p c_p^\dagger H^{(p)} c_p + \sum_{p_1,p_2} \left[ c_{p_1}^\dagger H^{(p_1,p_2)} c_{p_2} + h.c. \right]$$

The above equation expresses the initial Hamiltonian operator $H_f$ in terms of the single-particle Hamiltonian matrix H. The single-particle Hamiltonian matrix H may be converted into a matrix representation of the initial Hamiltonian operator $H_f$ via multiplication by the creation-operator and annihilation-operator vectors. In the above equation, the single-particle Hamiltonian matrix H includes a respective plurality of individual-part terms $H^{(p)}$ associated with the plurality of parts 24. In addition, the single-particle Hamiltonian matrix H includes a plurality of part interface terms $H^{(p_1,p_2)}$ associated with the respective interfaces 80 between pairs of the parts 24. Here, $H^{(p)}$ describes the coupling between fermionic modes within the part p, and $H^{(p_1,p_2)}$ describes the tunneling of fermions between the parts $p_1$ and $p_2$ across the interface 80 between them. Thus, in the above equation, the single-particle Hamiltonian matrix H may have the following block structure:

$$H = \begin{pmatrix} H^{(1)} & H^{(1,2)} & H^{(1,3)} & \cdots \\ [H^{(1,2)}]^\dagger & H^{(2)} & H^{(2,3)} & \cdots \\ [H^{(1,3)}]^\dagger & [H^{(2,3)}]^\dagger & H^{(3)} & \cdots \\ \vdots & \vdots & \vdots & \end{pmatrix}$$

The processor 12 may be configured to determine $H^{(p)}$ for each part 24 and $H^{(p_1,p_2)}$ for each pair of interfacing parts 24 based on the shapes and positions of the parts 24 indicated by the respective part geometries 26 of the parts 24, and further based on the respective material compositions 28 of the parts 24.

Based at least in part on the single-particle Hamiltonian matrix H, the processor 12 may be further configured to estimate a many-body ground state $|\psi_0\rangle$ for the plurality of parts 24. Estimating the many-body ground state $|\psi_0\rangle$ may include estimating a plurality of single-particle eigenstates of the single-particle Hamiltonian matrix H. The many-body ground state $|\psi_0\rangle$ may, for example, be computed at least in part by diagonalizing the single-particle Hamiltonian matrix H. The processor 12 may be configured to compute the many-body ground state $|\psi_0\rangle$ in $O(N^3)$ time or lower, where N is the total number of fermionic modes simulated. When the single-particle Hamiltonian matrix H is sparse, with $O(1)$ nonzero elements per row, the processor 12 may perform matrix-vector products on the single-particle Hamiltonian matrix H in $O(N)$ time. In addition, when $M \ll N$ eigenmodes of the single-particle Hamiltonian matrix H are occupied, the occupied eigenmodes may be computed in $O(MN)$ time. As discussed in further detail below, approximations may be made to decrease the value of M by computing a subset of the set of occupied eigenmodes rather than all occupied eigenmodes, thereby allowing $M \ll N$ to be assumed.

At the Hamiltonian transformation module 30, the processor 12 may be further configured to estimate a reduced density matrix $D_p$ associated with a first part p of the plurality of parts 24 based at least in part on the single-particle Hamiltonian matrix H. The processor 12 may be configured to estimate the reduced density matrix $D_p$ for the first part p based at least in part on the many-body ground state $|\psi_0\rangle$. The reduced density matrix $D_p$ is defined as $$D_p = \langle \psi_0 | c_p^\dagger \otimes c_p | \psi_0 \rangle$$

where $\otimes$ indicates an outer product of the vectors of creation operators and annihilation operators for the first part p. The reduced density matrices $D_p$ for the parts 24 of the quantum device are diagonal blocks of the full single-particle Green's function, the elements of which are given by $$D_{ij} = \langle \psi_0 | c_i^\dagger c_j | \psi_0 \rangle$$

Each density matrix satisfies the property $D_p = D_p^\dagger$, and the eigenvalues of $D_p$ are each within the interval [0,1].

The processor 12 may be further configured to estimate the plurality of eigenvectors and the corresponding plurality of eigenvalues of the reduced density matrix $D_p$. In addition, as discussed in further detail below, the processor 12 may be further configured to transform the single-particle Hamiltonian matrix H into a natural-orbital basis spanned by a subset of the plurality of eigenvectors of the density matrix $D_p$. Thus, the processor 12 may generate a transformed Hamiltonian matrix $\tilde{H}$, where the number of degrees of freedom of part p have been reduced. The natural orbitals $|n\rangle_p$ of the first part p are defined (using the notation $|\cdot\rangle_p$ for a normalized vector with support only in the part p) as the eigenvectors of the reduced density matrix $D_p$. The eigenvalue-eigenvector equation for the reduced density matrix $D_p$ may be expressed as $$D_p |n\rangle_p = \lambda_n^{(p)} |n\rangle_p$$

where the order of the eigenvalues is given by $\lambda_n^{(p)} \geq \lambda_{n+1}^{(p)}$.

In some examples, when the reduced density matrix $D_p$ is generated for the first part p, the processor 12 may be configured to approximate the reduced density matrix $D_p$ as an approximated reduced density matrix $\tilde{D}_p$. The processor 12 may be configured to generate the approximated reduced density matrix $\tilde{D}_p$ such that one or more fermionic modes outside a predefined energy window are excluded. For example, the predefined energy window may be centered around a Fermi energy of the plurality of parts p, which may be determined based at least in part on the part geometry 26 and the material composition 28 of the plurality of parts p indicated in the quantum device geometric model 22. Thus, the approximated reduced density matrix $\tilde{D}_p$ be constructed from M fermionic modes that are within the predefined energy window. The total number of fermionic degrees of freedom in the part p may be expressed as $N_p$.

The processor 12 may be further configured to compute the eigenvalues and eigenvectors of $\tilde{D}_p$ via an iterative approach. In the iterative approach, the reduced density matrix $\tilde{D}_p$ of the part p may be evaluated from a set of M eigenstates $\varphi_n(k)$ of the single-particle Hamiltonian matrix H, where n enumerates the fermionic modes and k enumerates the fermionic degrees of freedom in part p. Since the approximated reduced density matrix $\tilde{D}_p$ is generated such that eigenmodes outside the predefined energy window are excluded, the value of M may be lower compared to that of the reduced density matrix $D_p$. The processor 12 may be further configured to compute the elements of the approximated reduced density matrix $\tilde{D}_p$ as $$(\tilde{D}_p)_{kl} = \sum_n \varphi_n^*(k) \varphi_n(l)$$

In addition, the matrix-vector product of the reduced density matrix $\tilde{D}_p$ with some vector $|v\rangle$ may be computed as $$(\tilde{D}_p |v\rangle)_k = \sum_n \varphi_n^*(k) \left( \sum_l \varphi_n(l) |v\rangle_l \right)$$

The above equation corresponds to two consecutive matrix-vector products, which may be computed in $O(N_p M)$ time. Accordingly, approximating the reduced density matrix $D_p$ and computing the eigenvectors of the approximated reduced density matrix $\tilde{D}_p$ via the iterative approach may reduce processing time and memory utilization.

Although, in the above example, the iterative approach is used to compute the approximated reduced density matrix $\tilde{D}_p$, the iterative approach may alternatively be utilized to compute the reduced density matrix $D_p$ in examples in which the one or more fermionic modes outside the predefined energy window are not excluded.

In some examples, the processor 12 may be configured to account for interactions between electrons when computing the approximated reduced density matrix $\tilde{D}_p$. For example, the processor 12 may be configured to compute the many-body ground state $|\psi_0\rangle$ via a Hartree-Fock approximation or a self-consistent Bardeen-Cooper-Schrieffer approximation. The self-consistent Bardeen-Cooper-Schrieffer approximation may be used in examples in which the quantum device includes one or more superconducting parts. Estimating the many-body ground state $|\psi_0\rangle$ via a Hartree-Fock approximation or a self-consistent Bardeen-Cooper-Schrieffer approximation may allow the processor 12 to compute the natural-orbital basis in a manner that more accurately reflects the actual behavior of the quantum device relative to non-interacting approximations of the many-body ground state $|\psi_0\rangle$.

Generating the transformed Hamiltonian matrix $\tilde{H}$ may include transforming the single-particle Hamiltonian matrix H into the natural-orbital basis of the first part p such that the transformed Hamiltonian matrix $\tilde{H}$ has a reduced dimensionality relative to the single-particle Hamiltonian matrix H. As discussed above, a subset of the eigenvectors $|n\rangle_p$ may parametrize the natural-orbital basis. The eigenvectors $|n\rangle_p$ included in the subset may respectively have a predetermined number $N_k$ of largest eigenvalues $\lambda_n^{(p)}$ among the corresponding plurality of eigenvalues $\lambda_n^{(p)}$ of the density matrix $D_p$. In some examples, the processor 12 may utilize an eigenvalue magnitude threshold when determining which eigenvectors $|n\rangle_p$ are included in the subset, such that eigenvectors $|n\rangle_p$ that have respective eigenvalues $\lambda_n^{(p)}$ with magnitudes above the eigenvalue magnitude threshold are included. Since one or more of the eigenvectors $|n\rangle_p$ are excluded from the subset, the dimensionality of the natural-orbital vector space parametrized by the eigenvectors $|n\rangle_p$ included in the subset is lower than the dimensionality of the reduced density matrix $D_p$.

When generating the transformed Hamiltonian matrix $\tilde{H}$, the processor 12 may be further configured to generate a part-specific down-folding matrix $Q_p$ for the first part p. The part-specific down-folding matrix $Q_p$ may be an isometric matrix that encodes a transformation into the natural-orbital vector space of the first part p, where the natural-orbital vector space is parametrized by the subset of the plurality of eigenvectors $|n\rangle_p$ as discussed above. The part-specific down-folding matrix $Q_p$ may be an $N_k \times N_p$ matrix, where $N_k$ is the number of eigenvectors $|n\rangle_p$ included in the subset and $N_p$ is the number of fermionic modes in the first part p. The elements of the part-specific down-folding matrix $Q_p$ may be given by $(Q_p)_{nm} = [|n\rangle_p]_m$ where $(Q_p)_{nm}$ is the mth entry in the nth natural orbital for the first part p. Since the part-specific down-folding matrix $Q_p$ is an isometric matrix, it has the properties $Q_p Q_p^\dagger = 1_{N_k}$ and $(Q_p^\dagger Q_p)^2 = Q_p^\dagger Q_p$.

In examples in which the processor 12 is configured to generate a part-specific down-folding matrix $Q_p$, the processor 12 may be further configured to generate, from the part-specific down-folding matrix $Q_p$, a global down-folding matrix Q. The global down-folding matrix Q is a matrix that encodes a transformation into the natural-orbital bases of one or more parts 24 including the first part p. In addition, the global down-folding matrix Q may share the block structure of the single-particle Hamiltonian matrix H. For example, when the part index p=2 and the total number of parts P=3, the global down-folding matrix Q may be given by $$Q = \begin{pmatrix} 1 & 0 & 0 \\ 0 & Q_2 & 0 \\ 0 & 0 & 1 \end{pmatrix}$$

Subsequently to generating the global down-folding matrix Q, the processor 12 may be further configured to transform the single-particle Hamiltonian matrix H into the natural-orbital basis by multiplying a conjugate transpose $Q^\dagger$ of the global down-folding matrix Q by the single-particle Hamiltonian matrix H and by the global down-folding matrix Q to obtain the transformed Hamiltonian matrix $\tilde{H}$. Accordingly, the transformed Hamiltonian matrix $\tilde{H}$ may be expressed as $\tilde{H} = Q H Q^\dagger$ In addition, a matrix representation of the initial Hamiltonian operator $H_f$ may be transformed into the natural-orbital basis for the one or more parts 24 as follows:

$\tilde{H}_f = c^\dagger \tilde{H} c = c^\dagger Q H Q^\dagger c$

In some examples, the transformed matrix representation of the initial Hamiltonian operator $\tilde{H}_f$ may be included in the Schrödinger equation 44 that is solved at the solver 40.

Figure 5:
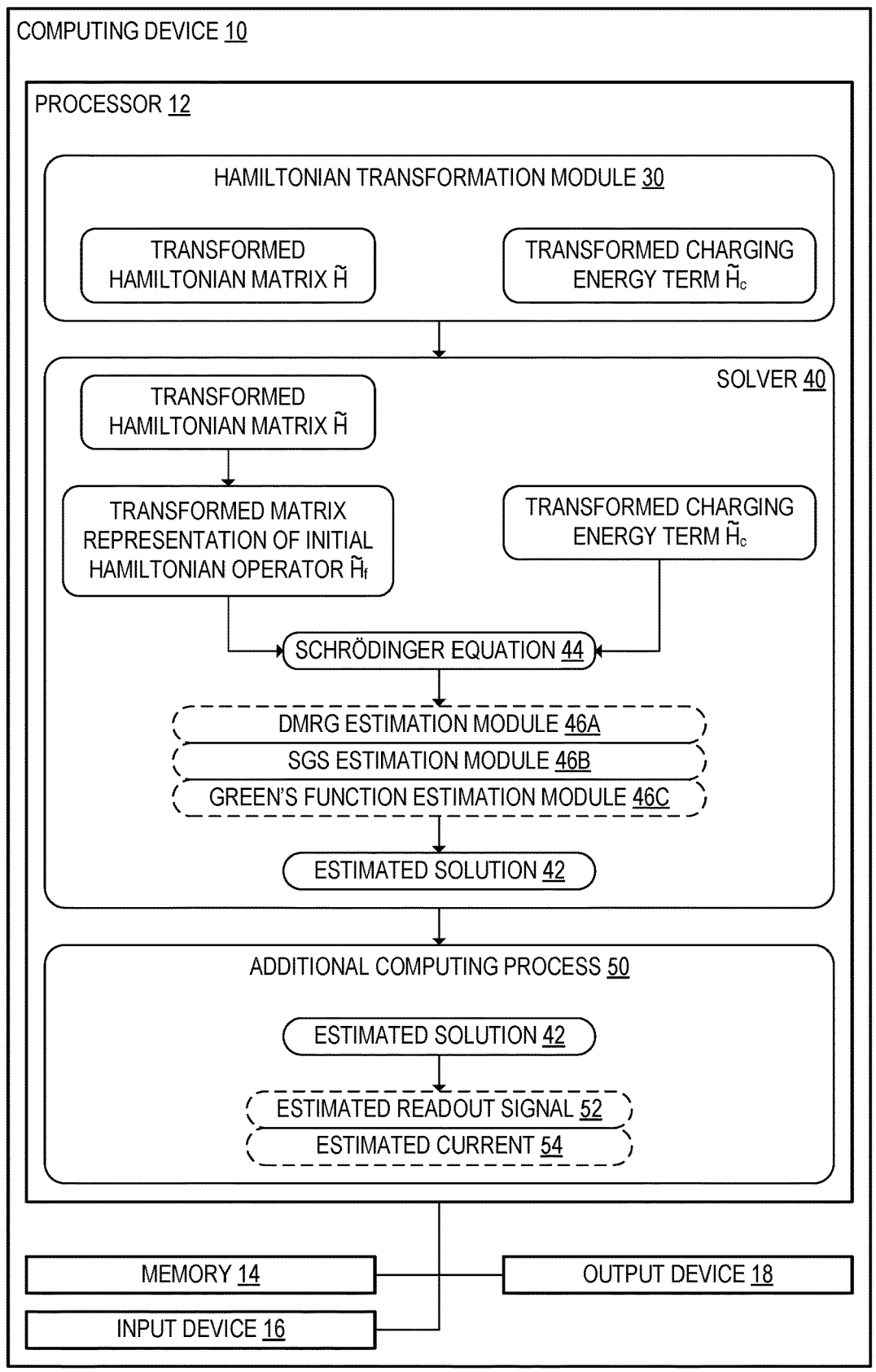
FIG. 5 schematically depicts the solver and the one or more additional computing processes in additional detail, according to the example of FIG. 1.

FIG. 5 schematically shows the computing device 10 in additional detail when the processor 12 executes the solver 40. At the solver 40, subsequently to generating the transformed Hamiltonian matrix $\tilde{H}$, the processor 12 may be further configured to input the transformed Hamiltonian matrix $\tilde{H}$ into a Schrödinger equation 44 that includes the transformed Hamiltonian matrix $\tilde{H}$. The Schrödinger equation 44 may have the following form that includes the transformed matrix representation of the initial Hamiltonian operator $\tilde{H}_f$:

$$\tilde{H}_f |\psi(t)\rangle = i\hbar \frac{\partial}{\partial t} |\psi(t)\rangle$$

where t is time and $|\psi(t)\rangle$ is the wavefunction in the quantum device. When the Schrödinger equation 44 is constructed, the transformed Hamiltonian matrix $\tilde{H}$ may be converted into the transformed matrix representation of the initial Hamiltonian operator $\tilde{H}_f$ via multiplication by the creation operator vector and the annihilation operator vector as discussed above.

The processor 12 may be further configured to generate an estimated solution 42 to the Schrödinger equation 44. Thus, the processor 12 may be configured to estimate behavior of the wavefunction $|\psi(t)\rangle$ such as the evolution of the wavefunction $|\psi(t)\rangle$ in the quantum device over time. When the processor 12 generates the estimated solution, the processor 12 may be configured to execute a density-matrix renormalization group (DMRG) estimation module 46A, a sums-of-Gaussians (SGS) module 46B, or a Green's function estimation module 46C at the solver 40. Thus, the processor 12 may be configured to generate the estimated solution at least in part by performing density-matrix renormalization group (DMRG) estimation, sums-of-Gaussians (SGS) estimation, or Green's function estimation on the Schrödinger equation 44 that includes the transformed Hamiltonian matrix $\tilde{H}$.

Subsequently to generating the estimated solution 42 at the solver 40, the processor 12 may be further configured to output the estimated solution 42 to one or more additional computing processes 50. For example, when the quantum device being simulated is a quantum computing device, the processor 12 may be further configured to generate an estimated readout signal 52 of the quantum device based at least in part on the estimated solution 42. The estimated readout signal 52 may, for example, be a qubit readout. As another example, the processor 12 may be further configured to generate an estimated current 54 flowing through at least the first part p based at least in part on the estimated solution 42. The processor 12 may additionally or alternatively be configured to compute one or more other results at the one or more additional computing processes 50.

In some examples, the global down-folding matrix Q may encode down-folding transformations for a plurality of parts 24 of the quantum device. In such examples, the processor 12 may be configured to generate two or more respective part-specific down-folding matrices for two or more parts 24. The two or more parts 24 may include the first part p, and the two or more part-specific down-folding matrices may include the part-specific down-folding matrix $Q_p$ for the first part p. The processor 12 may be further configured to generate the global down-folding matrix Q based at least in part on the two or more part-specific down-folding matrices for the two or more parts 24. In some examples, the global down-folding matrix Q may be generated based at least in part on the respective part-specific down-folding matrices $Q_p$ for all the parts 24 included in the quantum device geometric model 22.

Figure 6:
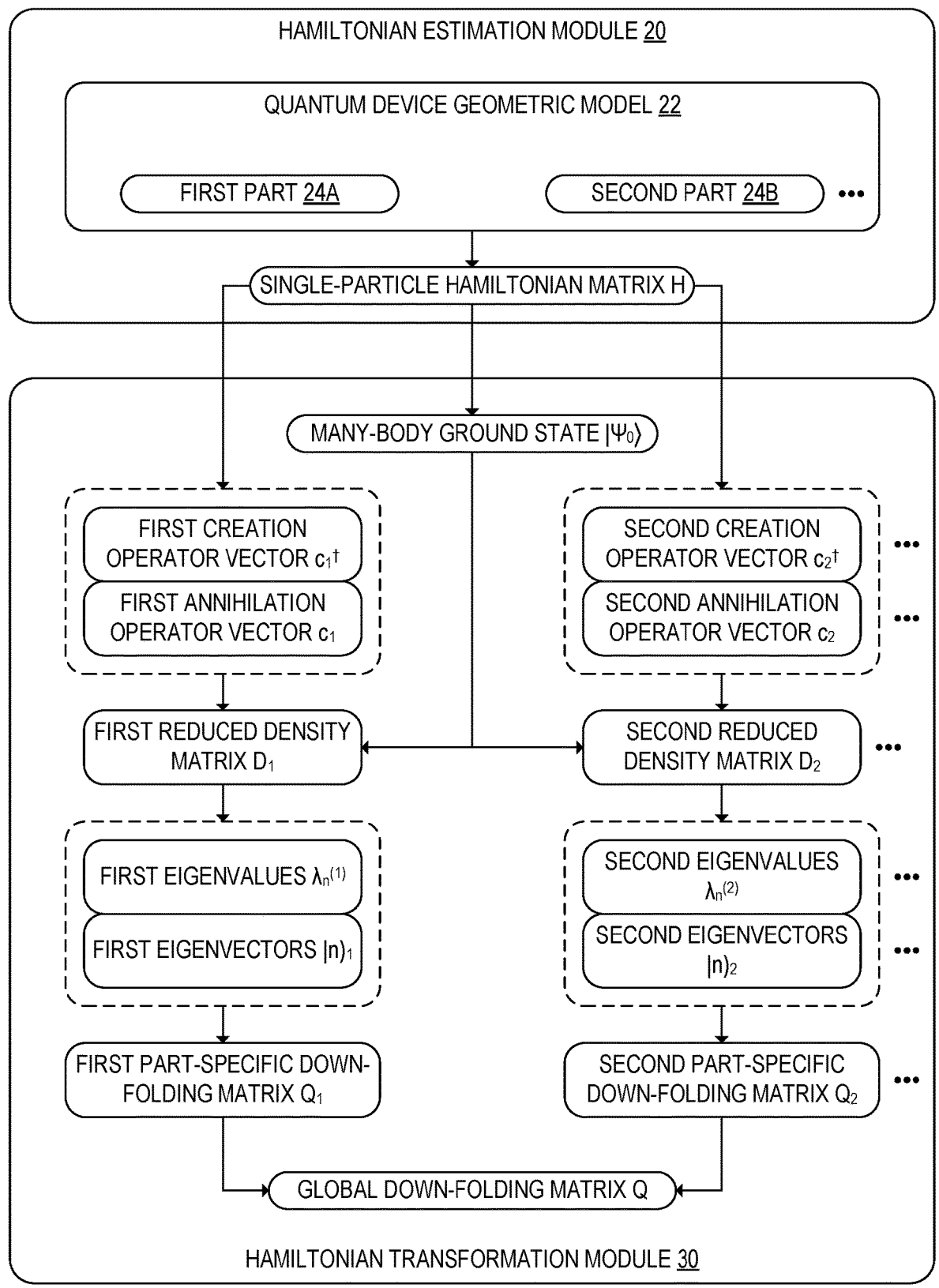
FIG. 6 schematically depicts the Hamiltonian estimation module and the Hamiltonian transformation module when a global down-folding matrix is generated for the first part and the second part of the quantum device, according to the example of FIG. 5.

FIG. 6 schematically shows the Hamiltonian estimation module 20 and the Hamiltonian transformation module 30 when the global down-folding matrix Q is generated for the first part 24A and the second part 24B of FIG. 4. In the example of FIG. 6, the processor 12 may be configured to generate a first creation operator vector $c_1^\dagger$ of creation operators associated with the first part 24A and a first annihilation operator vector $c_1$ of annihilation operators associated with the first part 24A. In addition, the processor 12 may be configured to generate a second creation operator vector $c_2^\dagger$ of creation operators associated with the second part 24B and a second annihilation operator vector $c_2$ of annihilation operators associated with the second part 24B.

Based on the first creation operator vector $c_1^\dagger$, the first annihilation operator vector $c_1$, and the many-body ground state $|\psi_0\rangle$, the processor 12 may be further configured to compute a first reduced density matrix $D_1$ of fermionic modes in the first part 24A. The processor 12 may be further configured to compute a plurality of first eigenvalues $\lambda_n^{(1)}$ and a corresponding plurality of first eigenvectors $|n\rangle_1$ of the first reduced density matrix $D_1$. Similarly, the processor 12 may be further configured to compute a second reduced density matrix $D_2$ of fermionic modes in the second part 24B based on the second creation operator vector $c_2^\dagger$, the second annihilation operator vector $c_2$, and the many-body ground state $|\psi_0\rangle$. The processor 12 may be further configured to compute a plurality of second eigenvalues $\Delta_n^{(2)}$ and a corresponding plurality of second eigenvectors $|n\rangle_2$ of the second reduced density matrix $D_2$. When the processor 12 computes the respective eigenvalues and eigenvectors of the first reduced density matrix $D_1$ and the second reduced density matrix $D_2$, the processor 12 may, in some examples, be configured to compute a first approximated reduced density matrix and a second approximated reduced density matrix and compute the respective eigenvalues and eigenvectors of the approximated reduced density matrices. Thus, in such examples, the first eigenvalues $\lambda_n^{(1)}$ and the first eigenvalues $|n\rangle_1$ may approximate the eigenvalues and eigenvectors of the first reduced density matrix $D_1$, and the second eigenvalues $\Delta_n^{(2)}$ and the second eigenvectors $|n\rangle_2$ may approximate the eigenvalues and eigenvectors of the second reduced density matrix $D_2$.

The processor 12 may be further configured to generate a first part-specific down-folding matrix $Q_1$ for the first part 24A based at least in part on the first eigenvalues $\lambda_n^{(1)}$ and the first eigenvectors $|n\rangle_i$. In addition, the processor 12 may be further configured to generate a second part-specific down-folding matrix $Q_2$ for the second part 24B based at least in part on the second eigenvalues $\Delta_n^{(2)}$ and the second eigenvectors $|n\rangle_2$. The processor 12 may be further configured to compute the global down-folding matrix Q based at least in part on the first part-specific down-folding matrix $Q_1$ and the second part-specific down-folding matrix $Q_2$. The global down-folding matrix Q may have the following block structure:

$$Q = \begin{pmatrix} Q_1 & 0 & \cdots \\ 0 & Q_2 & \cdots \\ \vdots & \vdots & \ddots \end{pmatrix}$$

In examples in which respective part-specific down-folding matrices are generated for more than two parts 24, the block structure of the global down-folding matrix Q may further include the respective part-specific down-folding matrices of one or more additional parts 24 along its diagonal.

In some examples, as discussed above, the quantum device geometric model 22 may further include a respective plurality of electrostatic charging energies $E_c^{(p)}$ of the plurality of parts 24. In such examples, the processor 12 may be further configured to compute a plurality of charging energy Hamiltonian terms $H_c$ that indicate the respective electrostatic charging energies $E_c^{(p)}$ of the plurality of parts 24. The plurality of charging energy Hamiltonian terms $H_c$ may be expressed as follows:

$$H_c = \frac{E_c^{(p)}}{2}\left(c_p^\dagger \cdot c_p - N_g^{(p)}\right)^2$$

In the above equation, denotes a vector inner product. In addition, $N_g^{(p)}$ is a dimensionless gate voltage applied to the part p. The sum of the single-particle Hamiltonian matrix H and the plurality of charging energy Hamiltonian terms $H_c$ may form an interacting Hamiltonian operator $H_{interacting}$. The processor 12 may be further configured to transform the interacting Hamiltonian operator $H_{interacting}$ into a transformed interacting Hamiltonian operator $\tilde{H}_{interacting}$.

In examples in which the processor 12 is configured to compute one or more charging energy Hamiltonian terms $H_c$, for each part p to which no non-trivial transformation is applied, $Q_p=1$ for that part, and the one or more charging energy terms $H_c$ are unchanged by the global down-folding matrix Q. For each part p to which a non-trivial transformation is applied such that $Q_p \neq 1$, the inner product of the creation operator vector and the annihilation operator vector for the part p may be approximated as $$c_p^\dagger \cdot c_p \approx d_p^\dagger \cdot d_p + \text{const.}$$

In the above equation, the $N_k$ new fermionic modes that parametrize the reduced-dimensionality vector space for the part p are denoted by $$d_p = Q_p c_p$$

The $N_k - N_p$ natural orbitals that are excluded from the subset of eigenvectors are treated as approximately inert and are included in the constant term.

With the above approximation of the inner product, the transformed charging energy Hamiltonian term $\tilde{H}_c$ for the part p may be expressed as $$\tilde{H}_c = \frac{E_c^{(p)}}{2}\left(d_p^\dagger \cdot d_p - \tilde{N}_g^{(p)}\right)^2$$

where $\tilde{N}_g^{(p)}$ is related to $N_g^{(p)}$ by an unknown constant shift. The shift may be an integer corresponding to the number of occupied inert orbitals $N_k - N_p$. In some examples, the gate voltages in the quantum device are not known up to a constant shift. Thus, in such examples, the constant shift between $N_g^{(p)}$ and $\tilde{N}_g^{(p)}$ may not interfere with computation of the estimated solution 42 to the Schrödinger equation 44.

Figure 7:
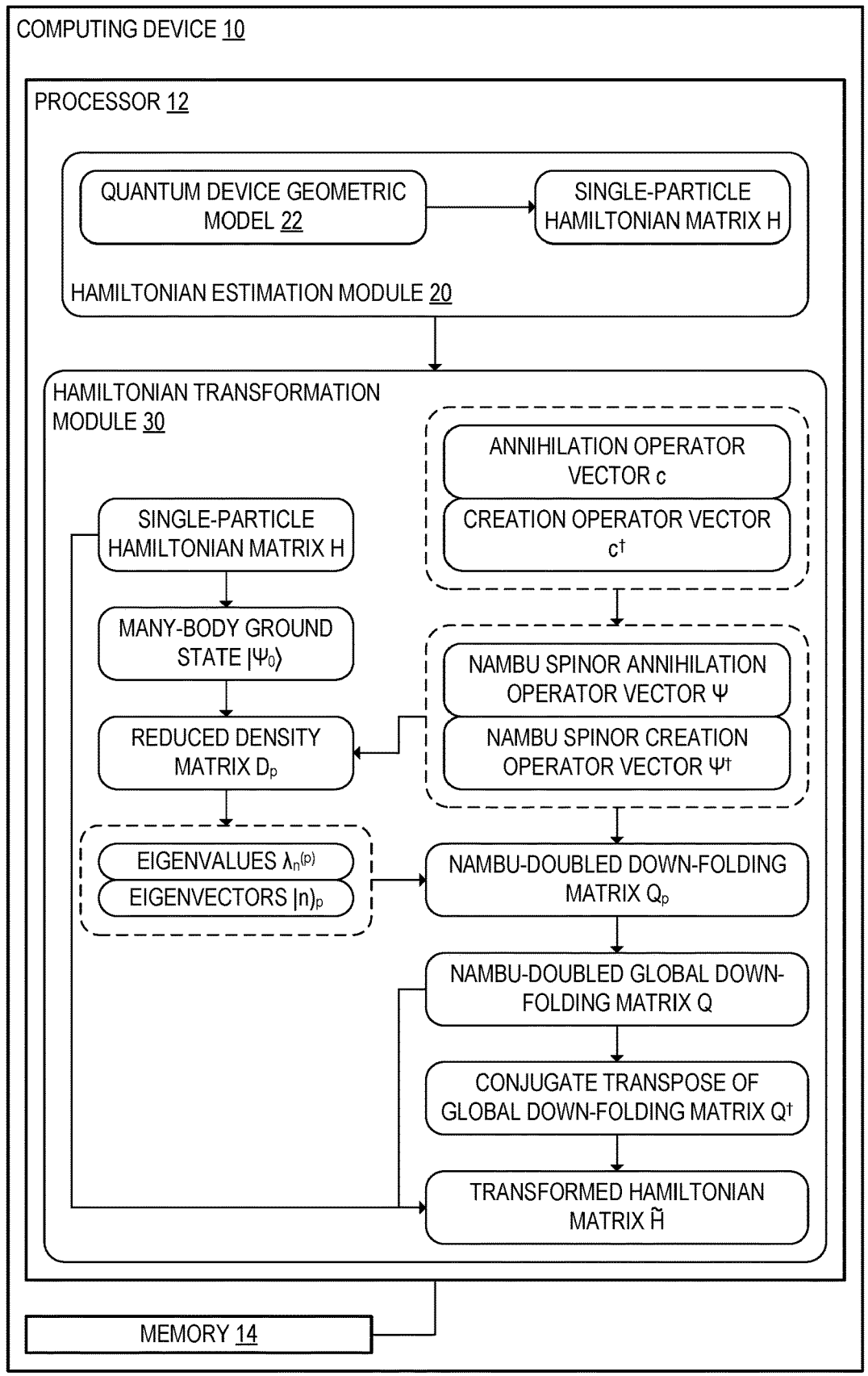
FIG. 7 shows the Hamiltonian transformation module when the processor utilizes Nambu spinors to compute the transformed Hamiltonian matrix, according to the example of FIG. 1.

In some examples, at least one part 24 of the plurality of parts 24 of the quantum device may be a superconducting part. In such examples, Nambu spinors may be utilized when computing the reduced density matrix $D_p$ and the part-specific down-folding matrix $Q_p$, as shown in the example of FIG. 7. The Nambu spinors may be defined elementwise as $$\Psi_i = (c_i, c_i^\dagger)$$

For a part p of the quantum device, the vector of Nambu spinors may be expressed as $\Psi_p$. The initial Hamiltonian operator $H_f$ may be expressed in a Bogoliubov-de Gennes (BdG) basis as $$H_{BdG} = \Psi^\dagger H \Psi = \sum_p \Psi_p^\dagger H^{(p)} \Psi_p + \sum_{p_1, p_2} \left[ \Psi_{p_1}^\dagger H^{(p_1, p_2)} \Psi_{p_2} + h.c. \right]$$

In examples in which the processor 12 is configured to compute one or more charging energy Hamiltonian terms $H_c$, the one or more charging energy Hamiltonian terms may be expressed in the BdG basis according to the equation for $H_c$ discussed above.

In examples in which the quantum device includes one or more superconducting parts, the processor 12 may be configured to compute the reduced density matrices $D_p$ and the part-specific down-folding matrices $Q_p$ differently for superconducting parts and non-superconducting parts. For non-superconducting parts, the natural orbitals are the eigenvectors of the reduced density matrix $D_p$, as discussed above with reference to FIG. 2. However, due to Nambu doubling that occurs in the BdG basis, the processor 12 may be further configured to generate the part-specific down-folding matrix $Q_p$ as a Nambu-doubled down-folding matrix for the first part p. The Nambu-doubled down-folding matrix may encode a transformation into a Nambu-doubled natural-orbital vector space of the first part p. The Nambu-doubled natural-orbital vector space may be spanned by the subset of the plurality of eigenvectors of the reduced density matrix $D_p$ and respective complex conjugates of the subset of the plurality of eigenvectors of the reduced density matrix $D_p$. Thus, the part-specific down-folding matrix $Q_p$ may be a $2N_k \times 2N_p$ matrix with nonzero elements given by $(Q_p)_{2n-1, 2m-1} = [|n\rangle_p]_m$ and $(Q_p)_{2n, 2m} = [|n\rangle_p]_m^*$ where $n = 1, \ldots, N_k$ and $m = 1, \ldots, N_p$. Thus, the odd rows and odd columns of the part-specific down-folding matrix $Q_p$ may be filled by the eigenvectors of the reduced density matrix $D_p$ while the even rows and the even columns of the part-specific down-folding matrix $Q_p$ may be filled by the complex conjugates of the eigenvectors of the reduced density matrix $D_p$.

From the Nambu-doubled down-folding matrix $Q_p$, the processor 12 may be further configured to generate the global down-folding matrix Q as a Nambu-doubled global down-folding matrix associated with the first part p. The Nambu-doubled global down-folding matrix Q may have the block structure of the single-particle Hamiltonian matrix H, with the Nambu-doubled down-folding matrices $Q_p$ associated with the respective parts along the diagonal of the Nambu-doubled global down-folding matrix Q. The processor 12 may be further configured to generate the transformed Hamiltonian matrix $\tilde{H}$ using the Nambu-doubled global down-folding matrix Q, as $QHQ^\dagger$. The above structure for the Nambu-doubled global down-folding matrix Q may preserve the particle-hole symmetry of the single-particle Hamiltonian matrix H when the transformed Hamiltonian matrix $\tilde{H}$ is computed using the Nambu-doubled global down-folding matrix Q.

For superconducting parts of the quantum device, the processor 12 may be further configured to utilize the Nambu spinor vectors when computing the reduced density matrices. When the first part p is the superconducting part, the processor 12 may be further configured to compute the reduced density matrix for the first part p as a Nambu-doubled density matrix given as follows:

$D_p^{(sc)} = \langle \psi_0 | \Psi_p^\dagger \otimes \Psi_p | \psi_0 \rangle$

The processor 12 may be further configured to compute the eigenvalues and eigenvectors of the Nambu-doubled density matrix $D_p^{(sc)}$, generate a Nambu-doubled down-folding matrix $Q_p$ from the eigenvalues and eigenvectors of the Nambu-doubled density matrix $D_p^{(sc)}$, and generate a Nambu-doubled global down-folding matrix Q from the Nambu-doubled down-folding matrix $Q_p$ as discussed above. The processor 12 may be further configured to transform the single-particle Hamiltonian matrix H into a Nambu-doubled natural-orbital basis to compute the transformed Hamiltonian matrix $\tilde{H}$.

The approaches discussed above may, in some examples, be used to simulate the behavior of all the parts 24 of the plurality of parts 24 included in the quantum device geometric model 22. Alternatively, in other examples, one or more respective estimated solutions 42 may be computed for one or more of the parts 24 using some other simulation technique.

Figure 8A:
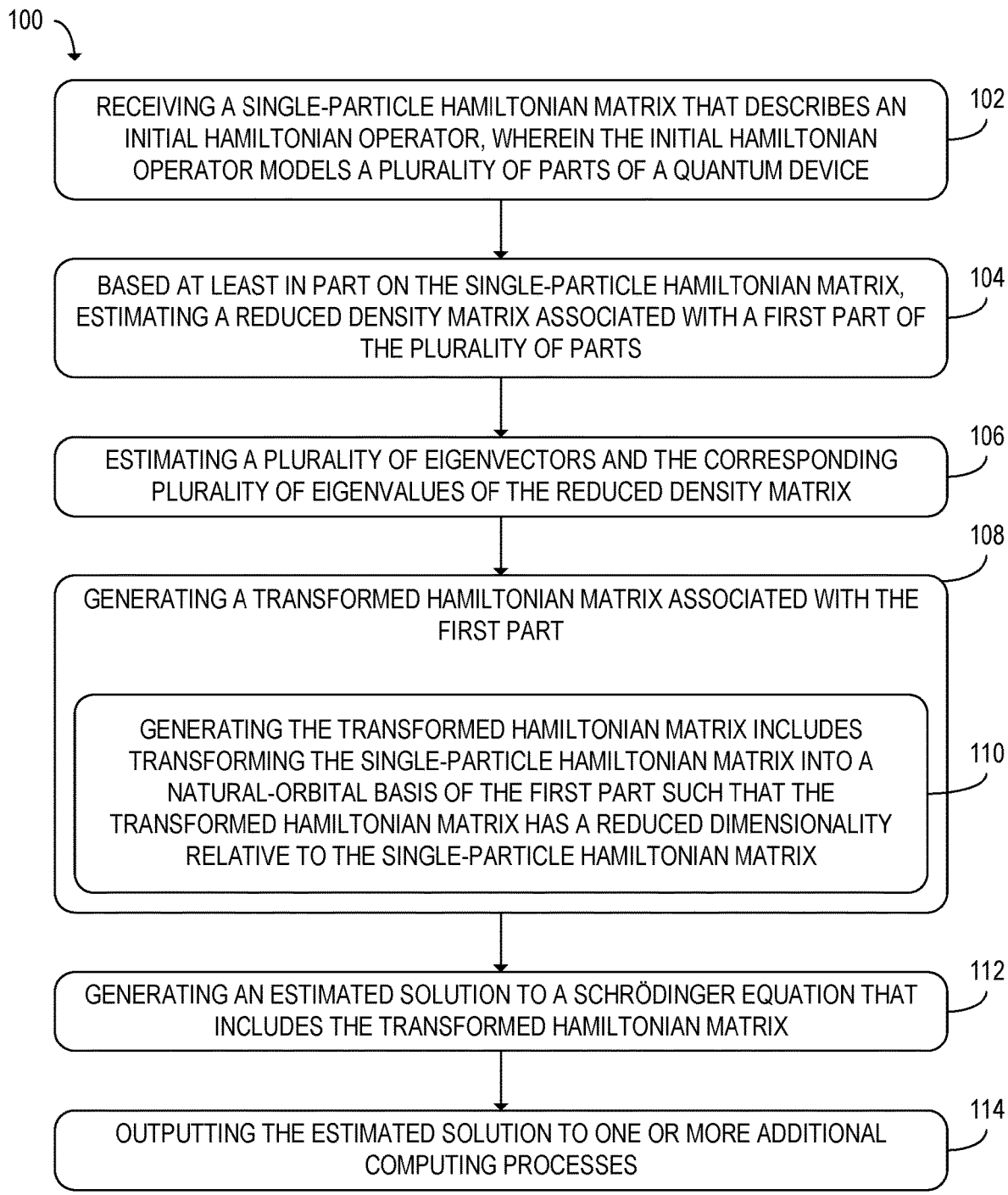
FIG. 8A shows a flowchart of an example method of simulating a quantum device at a computing device, according to the example of FIG. 1.

FIG. 8A shows a flowchart of an example method 100 of simulating a quantum device at a computing device. The method 100 may be performed at the computing device 10 of FIG. 1 or at some other computing device. At step 102, the method 100 may include receiving a single-particle Hamiltonian matrix that describes an initial Hamiltonian operator. The initial Hamiltonian operator may model a plurality of parts of a quantum device. The single-particle Hamiltonian matrix may, for example, be generated a Hamiltonian estimation module included in a quantum device simulator program and may be received at a Hamiltonian transformation module. In such examples, the single-particle Hamiltonian matrix may be generated based at least in part on user input received at a GUI.

Figure 8B:
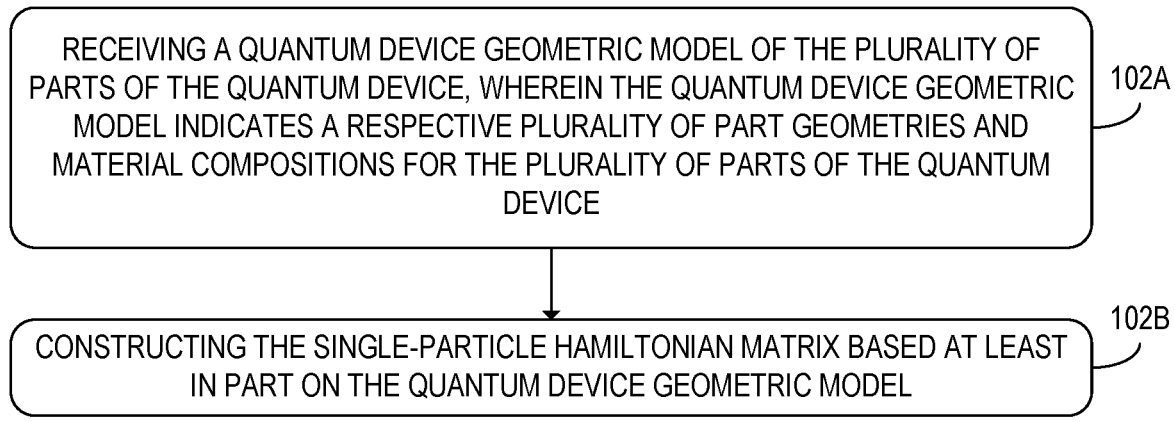
FIG. 8B shows additional steps of the method of FIG. 8A that may be performed in some examples when a quantum device geometric model is received.

FIG. 8B shows additional steps of the method 100 that may be performed in some examples prior to receiving the single-particle Hamiltonian matrix at step 102. At step 102A, the method 100 may further include receiving a quantum device geometric model of the plurality of parts of the quantum device. The quantum device geometric model indicates a respective plurality of part geometries and material compositions for the plurality of parts of the quantum device. For example, the part geometries and material compositions may be specified by the user at the GUI. At step 102B, the method 100 may further include constructing the single-particle Hamiltonian matrix based at least in part on the quantum device geometric model. The single-particle Hamiltonian matrix may, for example, be programmatically generated at the Hamiltonian estimation module based on the quantum device geometric model.

Returning to FIG. 8A, at step 104, the method 100 may further include estimating a reduced density matrix associated with a first part of the plurality of parts based at least in part on the single-particle Hamiltonian matrix. The reduced density matrix for the part may indicate respective densities of fermionic modes within the part.

Figure 8C:
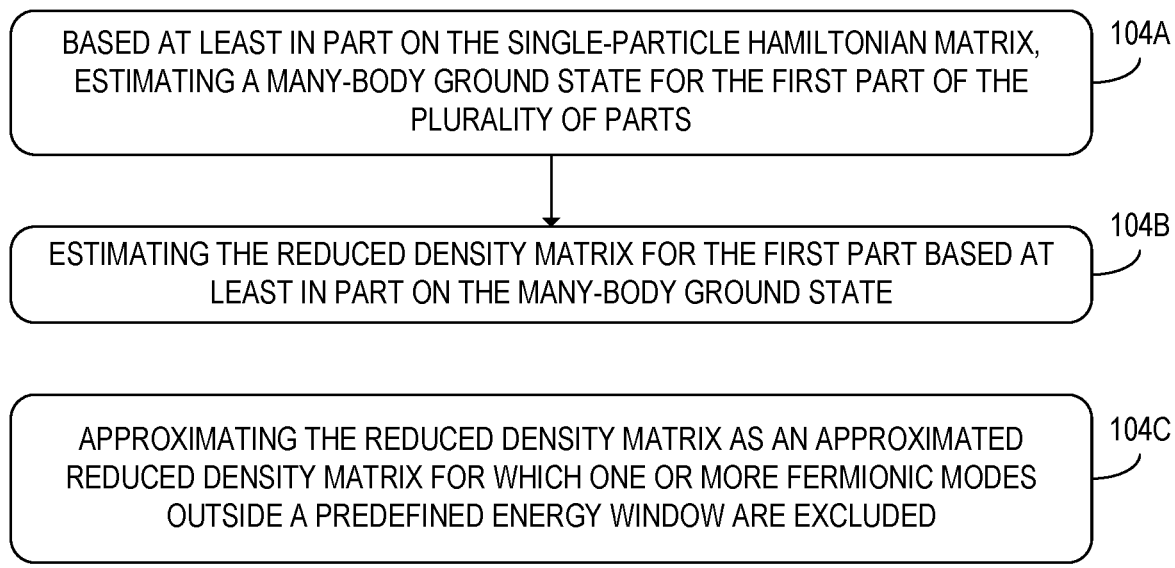
FIG. 8C shows additional steps of the method of FIG. 8A that may be performed in some examples when estimating a reduced density matrix.

FIG. 8C shows additional steps of the method 100 that may be performed in some examples when estimating the reduced density matrix at step 104. At step 104A, the method 100 may further include estimating a many-body ground state for the plurality of parts based at least in part on the single-particle Hamiltonian matrix. In some examples, the many-body ground state may be computed at least in part by performing a Hartree-Fock approximation or a self-consistent Bardeen-Cooper-Schrieffer approximation, thereby accounting for interactions between electrons within the first part. Alternatively, other methods of estimating the many-body ground state may be used.

At step 104B, in examples in which step 104A is performed, the method 100 may further include estimating the reduced density matrix for the first part based at least in part on the many-body ground state. The estimation of the reduced density matrix for a part may be further based at least in part on annihilation operators and creation operators for the fermionic modes in that part.

In some examples, at step 104C, step 106 of the method 100 may further include approximating the reduced density matrix as an approximated reduced density matrix for which one or more fermionic modes outside a predefined energy window are excluded. For example, the Fermi energy for the plurality of parts may be within the predefined energy window. In examples in which step 106C is performed, the Fermi energy may be computed based at least in part on the part geometry and material composition of the first part. Computing the approximated reduced density matrix may result in savings in computing time and memory utilization compared to computing the reduced density matrix based on all the occupied fermionic modes within the part.

Returning to FIG. 8A, at step 106, the method 100 may further include estimating a plurality of eigenvectors and the corresponding plurality of eigenvalues of the reduced density matrix. In examples in which step 104C is performed, the eigenvalues and eigenvectors of the reduced density matrix may be estimated by computing the eigenvalues and eigenvectors of the approximated reduced density matrix.

At step 108, the method 100 may further include generating a transformed Hamiltonian matrix associated with the first part. Generating the transformed Hamiltonian matrix may include, at step 110, transforming the single-particle Hamiltonian matrix into a natural-orbital basis of the first part such that the transformed Hamiltonian matrix has a reduced dimensionality relative to the single-particle Hamiltonian matrix. The natural-orbital basis may be spanned by a subset of the plurality of eigenvectors of the reduced density matrix. The eigenvectors included in the subset may respectively have a predetermined number of largest eigenvalues among the corresponding plurality of eigenvalues of the reduced density matrix. Alternatively, the eigenvectors included in the subset may have respective eigenvalues with magnitudes above an eigenvalue magnitude threshold.

Figure 8D:
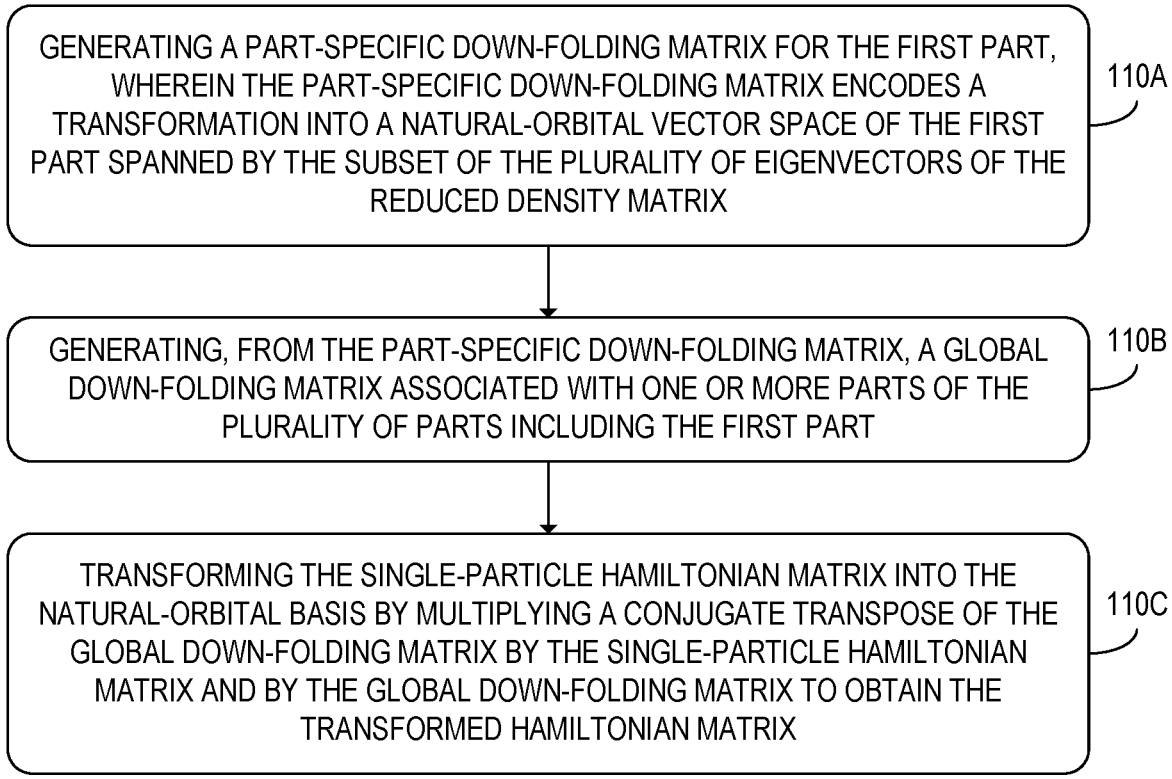
FIG. 8D shows additional steps of the method of FIG. 8A that may be performed in some examples when generating the transformed Hamiltonian matrix.

FIG. 8D shows additional steps of the method 100 that may be performed when the single-particle Hamiltonian matrix is transformed into the transformed Hamiltonian matrix at step 110. At step 110A, step 110 of the method 100 may further include generating a part-specific down-folding matrix for the first part. the part-specific down-folding matrix may encode a transformation into a natural-orbital vector space of the first part spanned by the subset of the plurality of eigenvectors of the reduced density matrix.

At step 110B, step 110 may further include generating, from the part-specific down-folding matrix, a global down-folding matrix associated with one or more parts of the plurality of parts including the first part. The block structure of the global down-folding matrix may include, along the diagonal of the global down-folding matrix, the respective part-specific down-folding matrices for the plurality of parts.

At step 110C, step 112 may further include transforming the single-particle Hamiltonian matrix into the natural-orbital basis. The single-particle Hamiltonian matrix may be transformed into the natural-orbital basis by multiplying a conjugate transpose of the global down-folding matrix by the single-particle Hamiltonian matrix and by the global down-folding matrix to obtain the transformed Hamiltonian matrix.

Figure 8E:
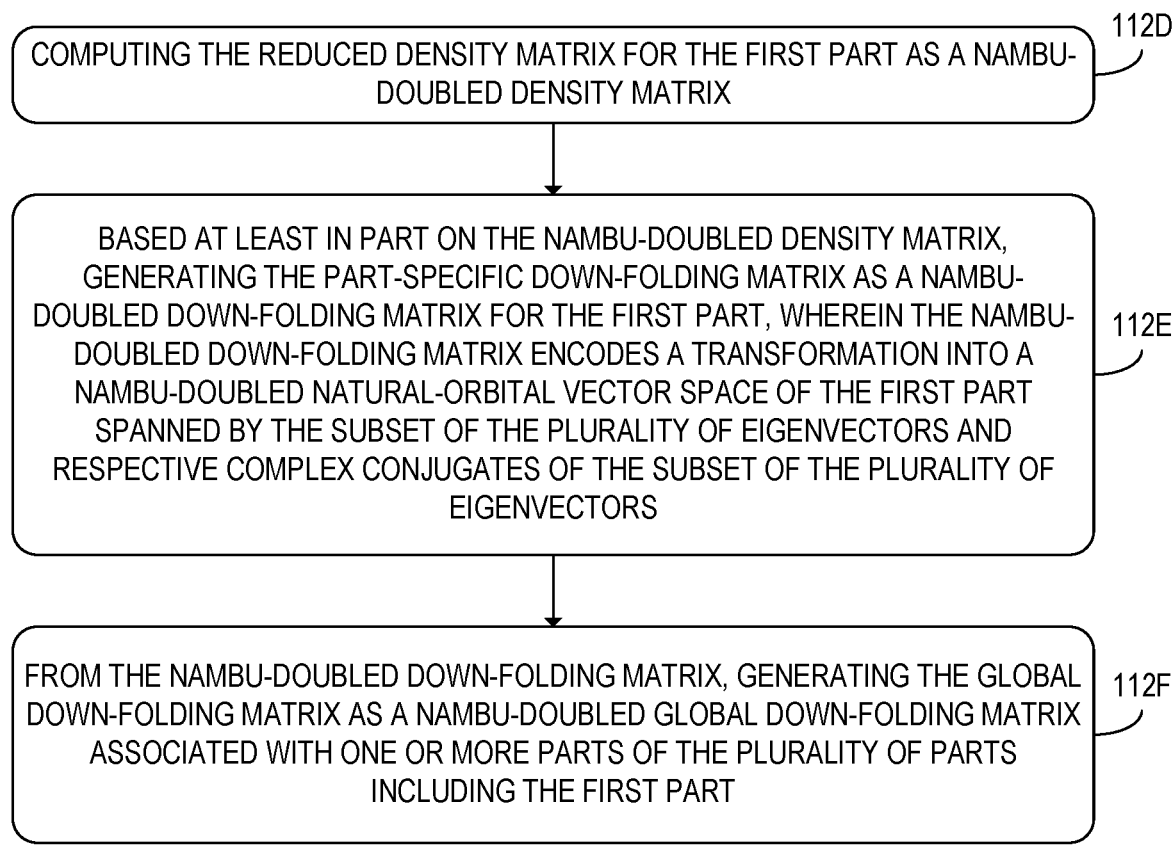
FIG. 8E shows additional steps of the method of FIG. 8A that may be performed when at least one part of the quantum device is a superconducting part.

FIG. 8E shows additional steps of the method 100 that may be performed when performing step 110 in examples in which at least one part of the plurality of parts of the quantum device is a superconducting part. At step 110D, step 110 may include computing the reduced density matrix for the first part as a Nambu-doubled density matrix. The Nambu-doubled density matrix may be computed using a Nambu spinor creation operator vector and a Nambu spinor annihilation operator vector for the first part in place of the creation operator vector and the annihilation operator vector for the first part, respectively.

At step 110E, step 110 may further include, based at least in part on the Nambu-doubled density matrix, generating the part-specific down-folding matrix as a Nambu-doubled down-folding matrix for the first part. The Nambu-doubled down-folding matrix may encode a transformation into a Nambu-doubled natural-orbital vector space of the first part spanned by the subset of the plurality of eigenvectors and respective complex conjugates of the subset of the plurality of eigenvectors. Respective Nambu-doubled down-folding matrices may be generated both for one or more superconducting parts and one or more non-superconducting parts of the quantum device.

At step 110F, step 110 may further include, from the Nambu-doubled down-folding matrix, generating the global down-folding matrix as a Nambu-doubled global down-folding matrix associated with one or more parts of the plurality of parts including the first part. The block structure of the Nambu-doubled global down-folding matrix may include, along the diagonal of the Nambu-doubled global down-folding matrix, the respective Nambu-doubled down-folding matrices for the plurality of parts.

Returning to FIG. 8A, the method 100 may further include, at step 112, generating an estimated solution to a Schrödinger equation that includes the transformed Hamiltonian matrix. The estimated solution may be an estimate of the evolution of the many-body wavefunction within the part as a function of time. In some examples, step 112 may include performing density-matrix renormalization group (DMRG) estimation, sums-of-Gaussians (SGS) estimation, or Green's function estimation on the Schrödinger equation that includes the transformed Hamiltonian matrix. Other numerical methods of estimating the solution to the Schrödinger equation may be used in other examples.

At step 114, the method 100 may further include outputting the estimated solution to one or more additional computing processes. For example, at the one or more additional computing processes, an estimated qubit readout of the quantum device may be generated in examples in which the quantum device is a quantum computing device. As another example, an estimated current flowing through at least the first part may be computed at the one or more additional computing processes. In some examples, the estimated solution may be presented to the user via one or more output devices.

Figure 8F:
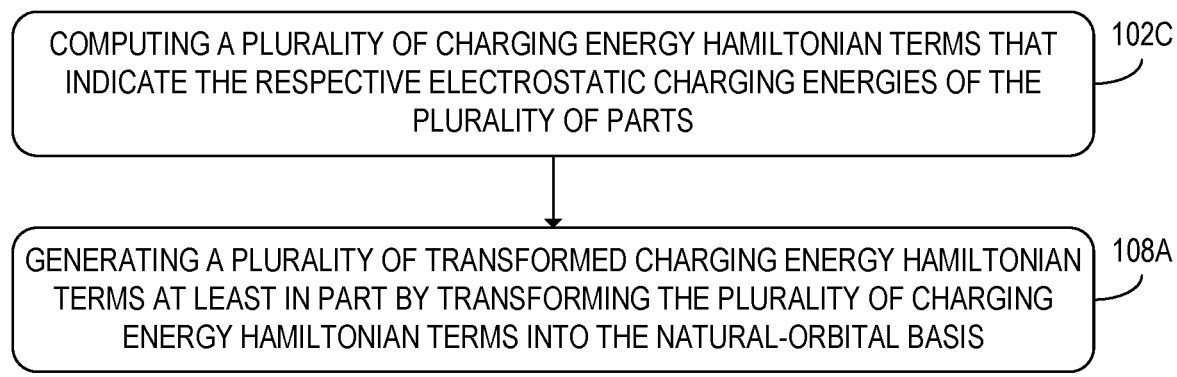
FIG. 8F shows additional steps of the method of FIG. 8A that may be performed when the quantum device geometric model includes a plurality of electrostatic charging energies.

FIG. 8F shows additional steps of the method 100 that may be performed in examples in which the steps of FIG. 8B are performed and in which the quantum device geometric model further includes a respective plurality of electrostatic charging energies of the plurality of parts. At step 102C, the method 100 may further include computing a plurality of charging energy Hamiltonian terms that indicate respective electrostatic charging energies of the plurality of parts. The plurality of charging energy Hamiltonian terms may be generated based at least in part on the quantum device geometric model. In some examples, step 102C may be performed when the single-particle Hamiltonian matrix is generated. At step 108A, the method 100 may further include generating a plurality of transformed charging energy Hamiltonian terms at least in part by transforming the plurality of charging energy Hamiltonian terms into the natural-orbital basis. Step 108A may be performed when the transformed Hamiltonian matrix is generated at step 108. Accordingly, in examples in which step 108A is performed, the sum of the transformed Hamiltonian matrix and the plurality of transformed charging energy Hamiltonian terms form a transformed interacting Hamiltonian operator.

Using the devices and methods discussed above, a many-body wavefunction within a quantum device may be simulated at a classical computing device in a time-efficient and memory-efficient manner. In addition, the devices and methods discussed above allow electrostatic charging and electron-electron interactions to be simulated accurately. Using the above approaches, correlation effects in quantum devices that operate in the Coulomb-blockade regime of finite charging energy may be simulated efficiently. For example, the devices and methods discussed above may be used when simulating tunnel junctions that are configured to control the dynamics of topological or semiconductor qubits. The devices and methods discussed above may also be used when simulating quantum dots that are configured to be used in the readout of topological qubits. The computing time and memory savings achieved using the above approaches may allow developers of quantum devices to iterate on device designs more quickly and interpret experimental results obtained at quantum devices more easily.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
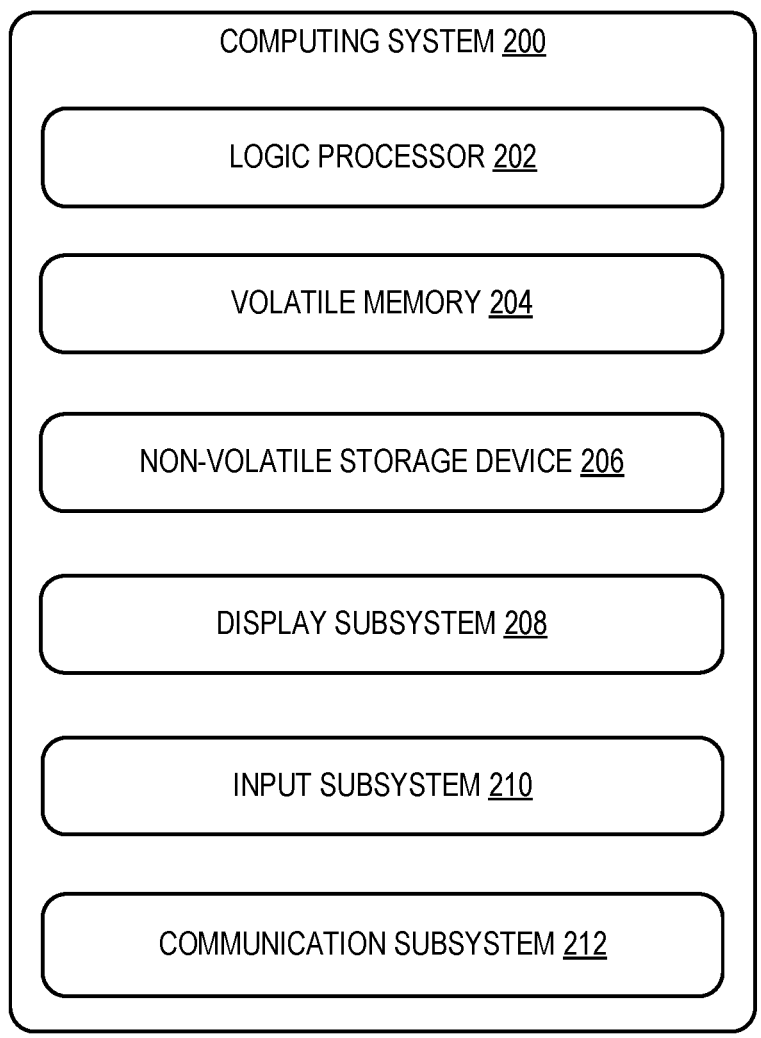
FIG. 9 shows a schematic view of an example computing environment in which the computing device of FIG. 1 may be instantiated.

FIG. 9 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Components of computing system 200 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 9.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs discuss several aspects of the present disclosure. According to one aspect of the present disclosure, a computing device is provided, including a processor configured to simulate a quantum device at least in part by receiving a single-particle Hamiltonian matrix that describes an initial Hamiltonian operator. The initial Hamiltonian operator may model a plurality of parts of a quantum device. Simulating the quantum device may further include, based at least in part on the single-particle Hamiltonian matrix, estimating a reduced density matrix associated with a first part of the plurality of parts. Simulating the quantum device may further include estimating a plurality of eigenvectors and a corresponding plurality of eigenvalues of the reduced density matrix. Simulating the quantum device may further include generating a transformed Hamiltonian matrix associated with the first part. Generating the transformed Hamiltonian matrix may include transforming the single-particle Hamiltonian matrix into a natural-orbital basis of the first part such that the transformed Hamiltonian matrix has a reduced dimensionality relative to the single-particle Hamiltonian matrix. The natural-orbital basis may be spanned by a subset of the plurality of eigenvectors of the reduced density matrix. The eigenvectors included in the subset may respectively have a predetermined number of largest eigenvalues among the corresponding plurality of eigenvalues of the reduced density matrix, or may have respective eigenvalues with magnitudes above an eigenvalue magnitude threshold. Simulating the quantum device may further include generating an estimated solution to a Schrödinger equation that includes the transformed Hamiltonian matrix. Simulating the quantum device may further include outputting the estimated solution to one or more additional computing processes.

According to this aspect, the processor may be further configured to receive a quantum device geometric model of the plurality of parts of the quantum device and construct the single-particle Hamiltonian matrix based at least in part on the quantum device geometric model. The quantum device geometric model may indicate a respective plurality of part geometries and material compositions for the plurality of parts of the quantum device.

According to this aspect, the quantum device geometric model may further include a respective plurality of electrostatic charging energies of the plurality of parts. The processor may be further configured to compute a plurality of charging energy Hamiltonian terms that indicate the respective electrostatic charging energies of the plurality of parts. The processor may be further configured to generate a plurality of transformed charging energy Hamiltonian terms at least in part by transforming the plurality of charging energy Hamiltonian terms into the natural-orbital basis. The Schrödinger equation may further include the plurality of transformed charging energy Hamiltonian terms of the plurality of parts, such that the transformed Hamiltonian matrix and the plurality of transformed charging energy Hamiltonian terms form a transformed interacting Hamiltonian operator.

According to this aspect, the processor may be further configured to, based at least in part on the single-particle Hamiltonian matrix, estimate a many-body ground state for the plurality of parts. Estimating the many-body ground state may include estimating a plurality of single-particle eigenstates of the single-particle Hamiltonian matrix. The processor may be further configured to estimate the reduced density matrix for the first part based at least in part on the many-body ground state.

According to this aspect, the processor may be configured estimate the reduced density matrix at least in part based on a Hartree-Fock approximation or a self-consistent Bardeen-Cooper-Schrieffer approximation.

According to this aspect, the processor may be further configured to generate a part-specific down-folding matrix for the first part. The part-specific down-folding matrix may encode a transformation into a natural-orbital vector space of the first part spanned by the subset of the plurality of eigenvectors of the reduced density matrix. The processor may be further configured to generate, from the part-specific down-folding matrix, a global down-folding matrix associated with one or more parts of the plurality of parts including the first part. The processor may be further configured to transform the single-particle Hamiltonian matrix into the natural-orbital basis by multiplying a conjugate transpose of the global down-folding matrix by the single-particle Hamiltonian matrix and by the global down-folding matrix to obtain the transformed Hamiltonian matrix.

According to this aspect, the processor may be configured to generate two or more respective part-specific down-folding matrices for two or more parts. The two or more parts may include the first part. The two or more part-specific down-folding matrices may include the part-specific down-folding matrix. The processor may be further configured to generate the global down-folding matrix based at least in part on the two or more part-specific down-folding matrices.

According to this aspect, at least one part of the plurality of parts of the quantum device may be a superconducting part. The processor may be further configured to compute the reduced density matrix for the first part as a Nambu-doubled density matrix. Based at least in part on the Nambu-doubled density matrix, the processor may be further configured to generate the part-specific down-folding matrix as a Nambu-doubled down-folding matrix for the first part. The Nambu-doubled down-folding matrix may encode a transformation into a Nambu-doubled natural-orbital vector space of the first part spanned by the subset of the plurality of eigenvectors and respective complex conjugates of the subset of the plurality of eigenvectors. From the Nambu-doubled down-folding matrix, the processor may be further configured to generate the global down-folding matrix as a Nambu-doubled global down-folding matrix associated with one or more parts of the plurality of parts including the first part.

According to this aspect, the first part may be the superconducting part. The processor may be configured to compute the reduced density matrix for the first part as a Nambu-doubled reduced density matrix.

According to this aspect, the single-particle Hamiltonian matrix may include a respective plurality of individual-part terms associated with the plurality of parts and a plurality of part interface terms associated with respective interfaces between pairs of the parts.

According to this aspect, the processor may be configured to approximate the reduced density matrix as an approximated reduced density matrix for which one or more fermionic modes outside a predefined energy window are excluded.

According to this aspect, the processor may be configured to generate the estimated solution at least in part by performing density-matrix renormalization group (DMRG) estimation, sums-of-Gaussians (SGS) estimation, or Green's function estimation.

According to this aspect, the processor may be further configured to generate, based at least in part on the estimated solution, an estimated readout signal of the quantum device or an estimated current flowing through at least the first part.

According to another aspect of the present disclosure, a method of simulating a quantum device using a computing device is provided. The method may include receiving a single-particle Hamiltonian matrix that describes an initial Hamiltonian operator. The initial Hamiltonian operator may model a plurality of parts of the quantum device. The method may further include, based at least in part on the single-particle Hamiltonian matrix, estimating a reduced density matrix associated with a first part of the plurality of parts. The method may further include estimating a plurality of eigenvectors and the corresponding plurality of eigenvalues of the reduced density matrix. The method may further include generating a transformed Hamiltonian matrix associated with the first part. Generating the transformed Hamiltonian matrix may include transforming the single-particle Hamiltonian matrix into a natural-orbital basis of the first part such that the transformed Hamiltonian matrix has a reduced dimensionality relative to the single-particle Hamiltonian matrix. The natural-orbital basis may be spanned by a subset of the plurality of eigenvectors of the reduced density matrix. The eigenvectors included in the subset may respectively have a predetermined number of largest eigenvalues among the corresponding plurality of eigenvalues of the reduced density matrix, or may have respective eigenvalues with magnitudes above an eigenvalue magnitude threshold. The method may further include generating an estimated solution to a Schrödinger equation that includes the transformed Hamiltonian matrix. The method may further include outputting the estimated solution to one or more additional computing processes.

According to this aspect, the method may further include receiving a quantum device geometric model of the plurality of parts of the quantum device. The quantum device geometric model may indicate a respective plurality of part geometries and material compositions for the plurality of parts of the quantum device. The method may further include constructing the single-particle Hamiltonian matrix based at least in part on the quantum device geometric model.

According to this aspect, the quantum device geometric model may further include a respective plurality of electrostatic charging energies of the plurality of parts. The method may further include computing a plurality of charging energy Hamiltonian terms that indicate the respective electrostatic charging energies of the plurality of parts. The method may further include generating a plurality of transformed charging energy Hamiltonian terms at least in part by transforming the plurality of charging energy Hamiltonian terms into the natural-orbital basis. The Schrödinger equation may further include the plurality of transformed charging energy Hamiltonian terms of the plurality of parts, such that the transformed Hamiltonian matrix and the plurality of transformed charging energy Hamiltonian terms form a transformed interacting Hamiltonian operator.

According to this aspect, the method may further include, based at least in part on the single-particle Hamiltonian matrix, estimating a many-body ground state for the plurality of parts. Estimating the many-body ground state may include estimating a plurality of single-particle eigenstates of the single-particle Hamiltonian matrix. The method may further include estimating the reduced density matrix for the first part based at least in part on the many-body ground state.

According to this aspect, the method may further include generating a part-specific down-folding matrix for the first part. The part-specific down-folding matrix may encode a transformation into a natural-orbital vector space of the first part spanned by the subset of the plurality of eigenvectors of the reduced density matrix. The method may further include generating, from the part-specific down-folding matrix, a global down-folding matrix associated with one or more parts of the plurality of parts including the first part. The method may further include transforming the single-particle Hamiltonian matrix into the natural-orbital basis by multiplying a conjugate transpose of the global down-folding matrix by the single-particle Hamiltonian matrix and by the global down-folding matrix to obtain the transformed Hamiltonian matrix.

According to this aspect, at least one part of the plurality of parts of the quantum device may be a superconducting part. The method may further include computing the reduced density matrix for the first part as a Nambu-doubled density matrix. The method may further include, based at least in part on the Nambu-doubled density matrix, generating the part-specific down-folding matrix as a Nambu-doubled down-folding matrix for the first part. The Nambu-doubled down-folding matrix may encode a transformation into a Nambu-doubled natural-orbital vector space of the first part spanned by the subset of the plurality of eigenvectors and respective complex conjugates of the subset of the plurality of eigenvectors. The method may further include, from the Nambu-doubled down-folding matrix, generating the global down-folding matrix as a Nambu-doubled global down-folding matrix associated with one or more parts of the plurality of parts including the first part.

According to another aspect of the present disclosure, a computing device is provided, including a processor configured to simulate a quantum device at least in part by, at a Hamiltonian estimation module, receiving a single-particle Hamiltonian matrix that describes an initial Hamiltonian operator. The initial Hamiltonian operator may model a plurality of parts of the quantum device. Simulating the quantum device may further include, at a Hamiltonian transformation module, estimating a many-body ground state for the plurality of parts based at least in part on the single-particle Hamiltonian matrix. Estimating the many-body ground state may include estimating a plurality of single-particle eigenstates of the single-particle Hamiltonian matrix. Simulating the quantum device may further include, based at least in part on the many-body ground state, computing a reduced density matrix for the first part. Simulating the quantum device may further include estimating a plurality of eigenvalues and a corresponding plurality of eigenvectors of the reduced density matrix. Simulating the quantum device may further include generating a part-specific down-folding matrix for the first part. The part-specific down-folding matrix may encode a transformation into a natural-orbital vector space of the first part spanned by the subset of the plurality of eigenvectors of the reduced density matrix. Simulating the quantum device may further include generating, from the part-specific down-folding matrix, a global down-folding matrix associated with one or more parts of the plurality of parts including the first part. Simulating the quantum device may further include transforming the single-particle Hamiltonian matrix into the natural-orbital basis by multiplying a conjugate transpose of the global down-folding matrix by the single-particle Hamiltonian matrix and by the global down-folding matrix to obtain the transformed Hamiltonian matrix. Simulating the quantum device may further include, at a solver, generating an estimated solution to a Schrödinger equation that includes the transformed Hamiltonian matrix. Simulating the quantum device may further include outputting the estimated solution to one or more additional computing processes.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor configured to simulate a quantum device at least in part by:
receiving a single-particle Hamiltonian matrix that describes an initial Hamiltonian operator, wherein the initial Hamiltonian operator models a plurality of quantum device hardware components of the quantum device;
based at least in part on the single-particle Hamiltonian matrix, estimating a reduced density matrix associated with a first quantum device hardware component of the plurality of quantum device hardware components;
estimating a plurality of eigenvectors and a corresponding plurality of eigenvalues of the reduced density matrix;
generating a transformed Hamiltonian matrix associated with the first quantum device hardware component, wherein:
generating the includes transformed Hamiltonian matrix transforming the single-particle Hamiltonian matrix into a natural-orbital basis of the first quantum device hardware component such that the transformed Hamiltonian matrix has a reduced dimensionality relative to the single-particle Hamiltonian matrix;
the natural-orbital basis is spanned by a subset of the plurality of eigenvectors of the reduced density matrix; and
the eigenvectors included in the subset respectively have a predetermined number of largest eigenvalues among the corresponding plurality of eigenvalues of the reduced density matrix, or have respective eigenvalues with magnitudes above an eigenvalue magnitude threshold;
generating an estimated solution to a Schrödinger equation that includes the transformed Hamiltonian matrix; and
outputting the estimated solution to one or more additional computing processes.

2. The computing device of claim 1, wherein:
the processor is further configured to:
receive a quantum device geometric model of the plurality of quantum device hardware components of the quantum device; and
construct the single-particle Hamiltonian matrix based at least in part on the quantum device geometric model; and
the quantum device geometric model indicates a respective plurality of part geometries and material compositions for the plurality of quantum device hardware components of the quantum device.

3. The computing device of claim 2, wherein:
the quantum device geometric model further includes a respective plurality of electrostatic charging energies of the plurality of quantum device hardware components; and
the processor is further configured to:
compute a plurality of charging energy Hamiltonian terms that indicate the respective electrostatic charging energies of the plurality of quantum device hardware components; and
generate a plurality of transformed charging energy Hamiltonian terms at least in part by transforming the plurality of charging energy Hamiltonian terms into the natural-orbital basis; and
the Schrödinger equation further includes the plurality of transformed charging energy Hamiltonian terms of the plurality of quantum device hardware components, such that the transformed Hamiltonian matrix and the plurality of transformed charging energy Hamiltonian terms form a transformed interacting Hamiltonian operator.

4. The computing device of claim 1, wherein the processor is further configured to:
based at least in part on the single-particle Hamiltonian matrix, estimate a many-body ground state for the plurality of quantum device hardware components, wherein estimating the many-body ground state includes estimating a plurality of single-particle eigenstates of the single-particle Hamiltonian matrix; and
estimate the reduced density matrix for the first quantum device hardware component based at least in part on the many-body ground state.

5. The computing device of claim 4, wherein the processor is configured estimate the reduced density matrix at least in part based on a Hartree-Fock approximation or a self-consistent Bardeen-Cooper-Schrieffer approximation.

6. The computing device of claim 1, wherein the processor is further configured to:
generate a part-specific down-folding matrix for the first quantum device hardware component, wherein the part-specific down-folding matrix encodes a transformation into a natural-orbital vector space of the first quantum device hardware component spanned by the subset of the plurality of eigenvectors of the reduced density matrix;
generate, from the part-specific down-folding matrix, a global down-folding matrix associated with one or more quantum device hardware components of the plurality of quantum device hardware components including the first quantum device hardware component; and
transform the single-particle Hamiltonian matrix into the natural-orbital basis by multiplying a conjugate transpose of the global down-folding matrix by the single-particle Hamiltonian matrix and by the global down-folding matrix to obtain the transformed Hamiltonian matrix.

7. The computing device of claim 6, wherein the processor is configured to:
generate two or more respective part-specific down-folding matrices for two or more quantum device hardware components, wherein:
the two or more quantum device hardware components include the first quantum device hardware component; and
the two or more part-specific down-folding matrices include the part-specific down-folding matrix; and generate the global down-folding matrix based at least in part on the two or more part-specific down-folding matrices.

8. The computing device of claim 6, wherein:
at least one part of the plurality of quantum device hardware components of the quantum device is a superconducting quantum device hardware component; and
the processor is further configured to:
compute the reduced density matrix for the first quantum device hardware component as a Nambu-doubled density matrix;
based at least in part on the Nambu-doubled density matrix, generate the part-specific down-folding matrix as a Nambu-doubled down-folding matrix for the first quantum device hardware component, wherein the Nambu-doubled down-folding matrix encodes a transformation into a Nambu-doubled natural-orbital vector space of the first quantum device hardware component spanned by the subset of the plurality of eigenvectors and respective complex conjugates of the subset of the plurality of eigenvectors; and
from the Nambu-doubled down-folding matrix, generate the global down-folding matrix as a Nambu-doubled global down-folding matrix associated with one or more quantum device hardware components of the plurality of quantum device hardware components including the first quantum device hardware component.

9. The computing device of claim 8, wherein:
the first quantum device hardware component is the superconducting quantum device hardware component; and
the processor is configured to compute the reduced density matrix for the first quantum device hardware component as a Nambu-doubled reduced density matrix.

10. The computing device of claim 1, wherein the single-particle Hamiltonian matrix includes:
a respective plurality of individual-part terms associated with the plurality of quantum device hardware components; and
a plurality of part interface terms associated with respective interfaces between pairs of the quantum device hardware components.

11. The computing device of claim 1, wherein the processor is configured to approximate the reduced density matrix as an approximated reduced density matrix for which one or more fermionic modes outside a predefined energy window are excluded.

12. The computing device of claim 1, wherein the processor is configured to generate the estimated solution at least in part by performing density-matrix renormalization group (DMRG) estimation, sums-of-Gaussians (SGS) estimation, or Green's function estimation.

13. The computing device of claim 1, wherein the processor is further configured to generate, based at least in part on the estimated solution, an estimated readout signal of the quantum device or an estimated current flowing through at least the first quantum device hardware component.

14. A method of simulating a quantum device using a computing device, the method comprising:
receiving a single-particle Hamiltonian matrix that describes an initial Hamiltonian operator, wherein the initial Hamiltonian operator models a plurality of quantum device hardware components of the quantum device;

based at least in part on the single-particle Hamiltonian matrix, estimating a reduced density matrix associated with a first quantum device hardware component of the plurality of quantum device hardware components;

estimating a plurality of eigenvectors and the corresponding plurality of eigenvalues of the reduced density matrix;

generating a transformed Hamiltonian matrix associated with the first quantum device hardware component, wherein:
- generating the transformed Hamiltonian matrix includes transforming the single-particle Hamiltonian matrix into a natural-orbital basis of the first quantum device hardware component such that the transformed Hamiltonian matrix has a reduced dimensionality relative to the single-particle Hamiltonian matrix;
- the natural-orbital basis is spanned by a subset of the plurality of eigenvectors of the reduced density matrix; and
- the eigenvectors included in the subset respectively have a predetermined number of largest eigenvalues among the corresponding plurality of eigenvalues of the reduced density matrix, or have respective eigenvalues with magnitudes above an eigenvalue magnitude threshold;

generating an estimated solution to a Schrödinger equation that includes the transformed Hamiltonian matrix; and outputting the estimated solution to one or more additional computing processes.

15. The method of claim 14, further comprising:
receiving a quantum device geometric model of the plurality of quantum device hardware components of the quantum device, wherein the quantum device geometric model indicates a respective plurality of part geometries and material compositions for the plurality of quantum device hardware components of the quantum device; and
constructing the single-particle Hamiltonian matrix based at least in part on the quantum device geometric model.

16. The method of claim 15, wherein:
the quantum device geometric model further includes a respective plurality of electrostatic charging energies of the plurality of quantum device hardware components; and
the method further comprises:
- computing a plurality of charging energy Hamiltonian terms that indicate the respective electrostatic charging energies of the plurality of quantum device hardware components; and
- generating a plurality of transformed charging energy Hamiltonian terms at least in part by transforming the plurality of charging energy Hamiltonian terms into the natural-orbital basis; and
the Schrödinger equation further includes the plurality of transformed charging energy Hamiltonian terms of the plurality of quantum device hardware components, such that the transformed Hamiltonian matrix and the plurality of transformed charging energy Hamiltonian terms form a transformed interacting Hamiltonian operator.

17. The method of claim 14, further comprising:
based at least in part on the single-particle Hamiltonian matrix, estimating a many-body ground state for the plurality of quantum device hardware components, wherein estimating the many-body ground state includes estimating a plurality of single-particle eigenstates of the single-particle Hamiltonian matrix; and
estimating the reduced density matrix for the first quantum device hardware component based at least in part on the many-body ground state.

18. The method of claim 14, further comprising:
generating a part-specific down-folding matrix for the first quantum device hardware component, wherein the part-specific down-folding matrix encodes a transformation into a natural-orbital vector space of the first quantum device hardware component spanned by the subset of the plurality of eigenvectors of the reduced density matrix;

generating, from the part-specific down-folding matrix, a global down-folding matrix associated with one or more quantum device hardware components of the plurality of quantum device hardware components including the first quantum device hardware component; and transforming the single-particle Hamiltonian matrix into the natural-orbital basis by multiplying a conjugate transpose of the global down-folding matrix by the single-particle Hamiltonian matrix and by the global down-folding matrix to obtain the transformed Hamiltonian matrix.

19. The method of claim 18, wherein at least one part of the plurality of quantum device hardware components of the quantum device is a superconducting quantum device hardware component, the method further comprising:
computing the reduced density matrix for the first quantum device hardware component as a Nambu-doubled density matrix;

based at least in part on the Nambu-doubled density matrix, generating the part-specific down-folding matrix as a Nambu-doubled down-folding matrix for the first quantum device hardware component, wherein the Nambu-doubled down-folding matrix encodes a transformation into a Nambu-doubled natural-orbital vector space of the first quantum device hardware component spanned by the subset of the plurality of eigenvectors and respective complex conjugates of the subset of the plurality of eigenvectors; and from the Nambu-doubled down-folding matrix, generating the global down-folding matrix as a Nambu-doubled global down-folding matrix associated with one or more quantum device hardware components of the plurality of quantum device hardware components including the first quantum device hardware component.

20. A computing device comprising:
a processor configured to simulate a quantum device at least in part by:
at a Hamiltonian estimation module, receiving a single-particle Hamiltonian matrix that describes an initial Hamiltonian operator, wherein the initial Hamiltonian operator models a plurality of quantum device hardware components of the quantum device;
at a Hamiltonian transformation module:
based at least in part on the single-particle Hamiltonian matrix, estimating a many-body ground state for the plurality of quantum device hardware components, wherein estimating the many-body ground state includes estimating a plurality of single-particle eigenstates of the single-particle Hamiltonian matrix;

based at least in part on the many-body ground state, computing a reduced density matrix for the first quantum device hardware component;

estimating a plurality of eigenvalues and a corresponding plurality of eigenvectors of the reduced density matrix;

generating a part-specific down-folding matrix for the first quantum device hardware component, wherein the part-specific down-folding matrix encodes a transformation into a natural-orbital vector space of the first quantum device hardware component spanned by the subset of the plurality of eigenvectors of the reduced density matrix;

generating, from the part-specific down-folding matrix, a global down-folding matrix associated with one or more quantum device hardware components of the plurality of quantum device hardware components including the first quantum device hardware component; and transforming the single-particle Hamiltonian matrix into the natural-orbital basis by multiplying a conjugate transpose of the global down-folding matrix by the single-particle Hamiltonian matrix and by the global down-folding matrix to obtain the transformed Hamiltonian matrix; and at a solver:
generating an estimated solution to a Schrödinger equation that includes the transformed Hamiltonian matrix; and outputting the estimated solution to one or more additional computing processes.

\* \* \* \* \*